United States Patent
VanderSmitte et al.

(10) Patent No.: US 11,364,632 B2
(45) Date of Patent: Jun. 21, 2022

(54) SYSTEMS AND METHODS FOR TRANSPORTING AN OBJECT INTO AND OUT OF A VEHICLE

(71) Applicant: Toyota Motor North America, Inc., Piano, TX (US)

(72) Inventors: Eduard J. VanderSmitte, McKinney, TX (US); Shalini Keshavamurthy, Sunnyvale, CA (US); Jacob Ryan Morrow, Carrollton, TX (US)

(73) Assignee: Toyota Motor North America, Inc., Plano, TX (US)

( * ) Notice: Subject to any disclaimer, the term of this patent is extended or adjusted under 35 U.S.C. 154(b) by 302 days.

(21) Appl. No.: 16/558,741

(22) Filed: Sep. 3, 2019

(65) Prior Publication Data
US 2021/0060785 A1    Mar. 4, 2021

(51) Int. Cl.
*B25J 9/16* (2006.01)
*G06Q 10/08* (2012.01)
(Continued)

(52) U.S. Cl.
CPC .......... *B25J 9/1679* (2013.01); *B25J 9/1697* (2013.01); *B25J 19/0075* (2013.01); *B60R 7/00* (2013.01);
(Continued)

(58) Field of Classification Search
USPC ............................. 700/245–264; 701/23–28
See application file for complete search history.

(56) References Cited

U.S. PATENT DOCUMENTS 6,599,243 B2    7/2003 Woltermann et al.
7,866,723 B2    1/2011 Ninio et al.
(Continued)

FOREIGN PATENT DOCUMENTS

| CN | 202368406 U | 8/2012 | |
| JP | H09285494 A | 11/1997 | |
| WO | WO-2018213931 A1 * | 11/2018 | ............ B25J 5/007 |

OTHER PUBLICATIONS

Newell, M., "Uber offering rides to teens with new pilot program in Columbus" (https://abc6onyourside.com/news/local/uber-offering-rides-to-teens-with-new-pilot-program-in-columbus) (last downloaded May 15, 2019) Mar. 24, 2017 (4 pages).

*Primary Examiner* — Jonathan L Sample
(74) *Attorney, Agent, or Firm* — Christopher G. Darrow; Darrow Mustafa PC

(57) ABSTRACT

System, methods, and other embodiments described herein relate to transporting an object into and out of a vehicle using an arm mounted to the vehicle. In one embodiment, a method includes detecting a plurality of objects in an environment of the vehicle, and identifying at least one object for transportation. The method includes determining at least one attribute for the at least one object, and determining a transport plan of how to move the at least one object into the vehicle based on the determined at least one attribute. The method includes, based on the transport plan, controlling the arm to move from a retracted position inside the vehicle to an extended position outside the vehicle, to engage the at least one object, move from the extended position to the retracted position, and disengage the at least one object to move the at least one object into the vehicle.

20 Claims, 13 Drawing Sheets

(51) Int. Cl.
*B25J 19/00* (2006.01)
*B60R 7/00* (2006.01)
*G06V 20/56* (2022.01)

(52) U.S. Cl.
CPC ......... *G06Q 10/0832* (2013.01); *G06V 20/56* (2022.01)

(56) References Cited

U.S. PATENT DOCUMENTS

| | | | |
|---|---|---|---|
| 8,688,306 B1 | 4/2014 | Nemec et al. | |
| 9,333,649 B1* | 5/2016 | Bradski | G06V 10/60 |
| 9,488,982 B2 | 11/2016 | Gurin | |
| 9,785,911 B2* | 10/2017 | Galluzzo | B25J 5/007 |
| 9,796,529 B1* | 10/2017 | Hoareau | G05D 1/0282 |
| 9,963,106 B1 | 5/2018 | Ricci | |
| 10,088,846 B2 | 10/2018 | Gao et al. | |
| 10,147,325 B1 | 12/2018 | Copeland et al. | |
| 10,152,053 B1 | 12/2018 | Smith et al. | |
| 10,249,200 B1* | 4/2019 | Grenier | G08G 5/025 |
| 10,286,558 B1* | 5/2019 | Asada | B25J 13/003 |
| 11,048,250 B2* | 6/2021 | Dinkelbach | G08C 17/02 |
| 2004/0133082 A1 | 7/2004 | Abraham-Fuchs et al. | |
| 2004/0249502 A1 | 12/2004 | Truong et al. | |
| 2013/0226340 A1* | 8/2013 | Buchstab | B62D 57/00 700/245 |
| 2015/0352721 A1* | 12/2015 | Wicks | B25J 9/1687 700/228 |
| 2015/0360865 A1* | 12/2015 | Massey | B25J 11/008 414/275 |
| 2016/0016315 A1* | 1/2016 | Kuffner, Jr | B25J 19/06 901/49 |
| 2016/0249853 A1 | 9/2016 | Ricci | |
| 2017/0066592 A1* | 3/2017 | Bastian, II | B25J 5/007 |
| 2017/0107055 A1* | 4/2017 | Magens | B25J 5/007 |
| 2018/0088586 A1* | 3/2018 | Hance | G06Q 50/28 |
| 2018/0164809 A1 | 6/2018 | Moosaei et al. | |
| 2018/0211348 A1 | 7/2018 | Narayan et al. | |
| 2018/0251122 A1 | 9/2018 | Golston et al. | |
| 2018/0281657 A1* | 10/2018 | Healey | B25J 9/1697 |
| 2018/0297654 A1* | 10/2018 | Meager | B62D 61/02 |
| 2018/0311085 A1 | 11/2018 | Lacaze et al. | |
| 2019/0217477 A1* | 7/2019 | Paepcke | G05B 19/4189 |
| 2019/0232851 A1* | 8/2019 | Frederick | B60R 7/02 |
| 2019/0242916 A1* | 8/2019 | Guarracina | G01N 35/0099 |
| 2019/0287062 A1* | 9/2019 | Skaaksrud | H04B 1/3822 |
| 2019/0358818 A1* | 11/2019 | Kanitz | B25J 19/023 |
| 2020/0089257 A1* | 3/2020 | Gaither | G05D 1/0088 |
| 2020/0131725 A1* | 4/2020 | Hung | G06V 20/588 |

* cited by examiner

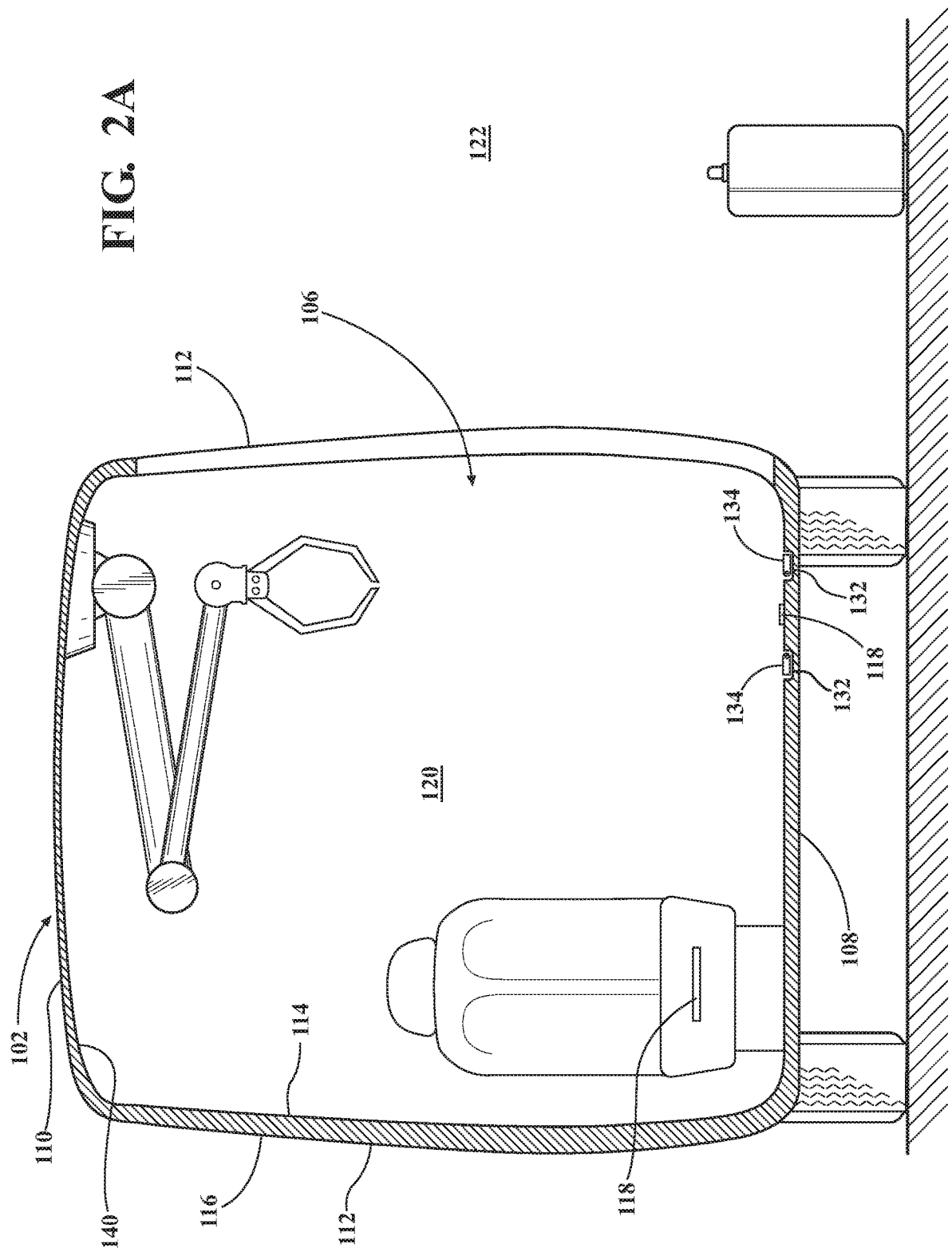

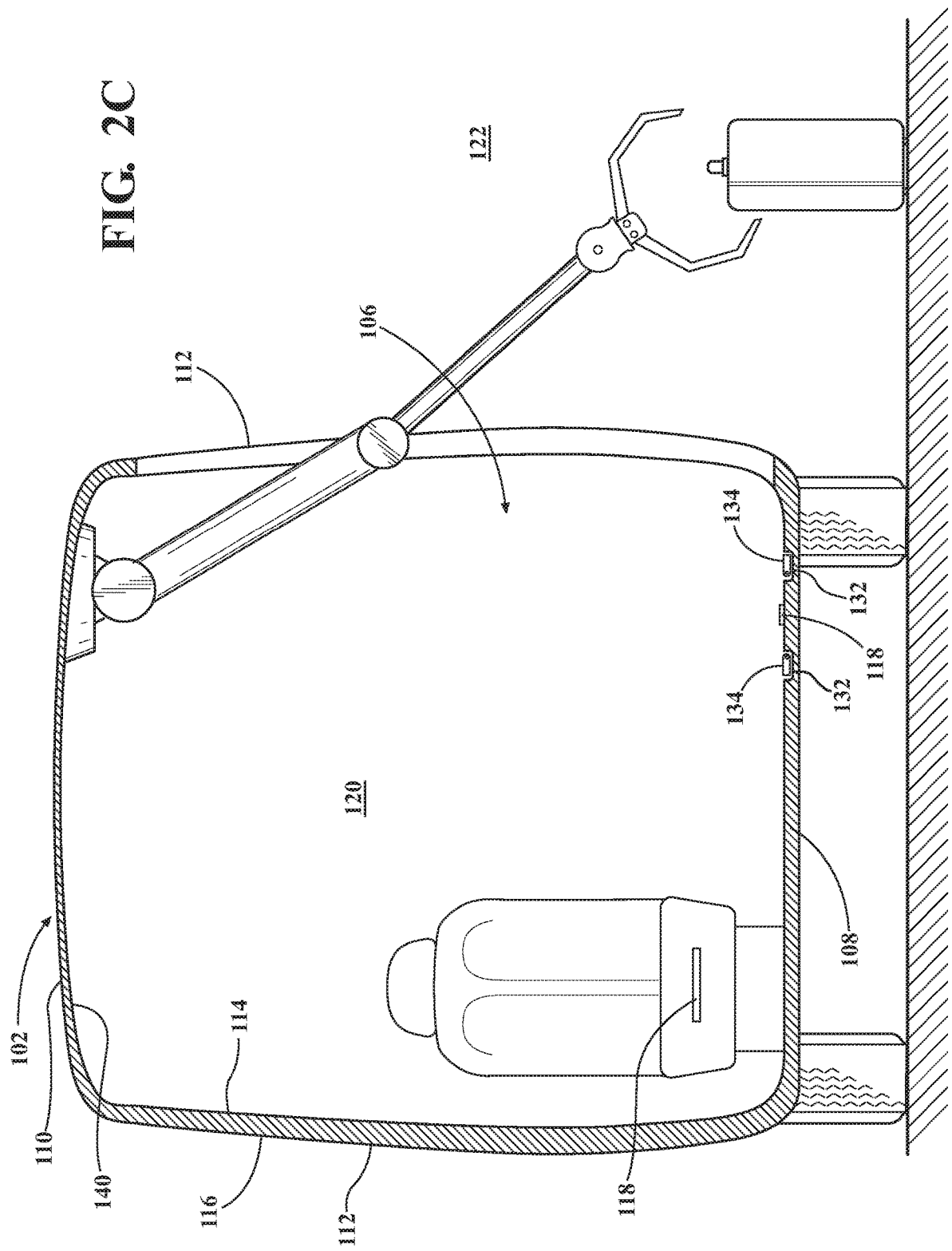

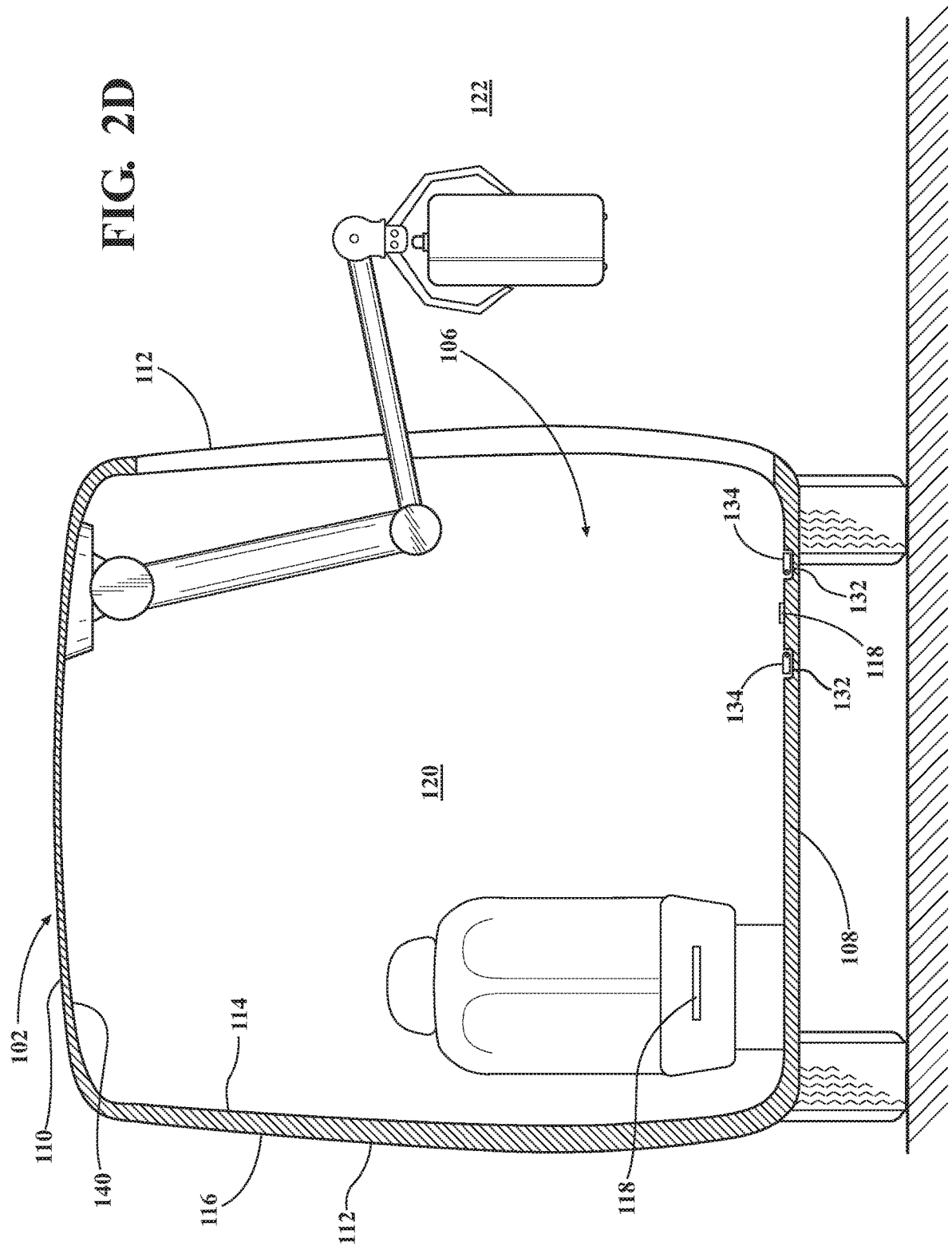

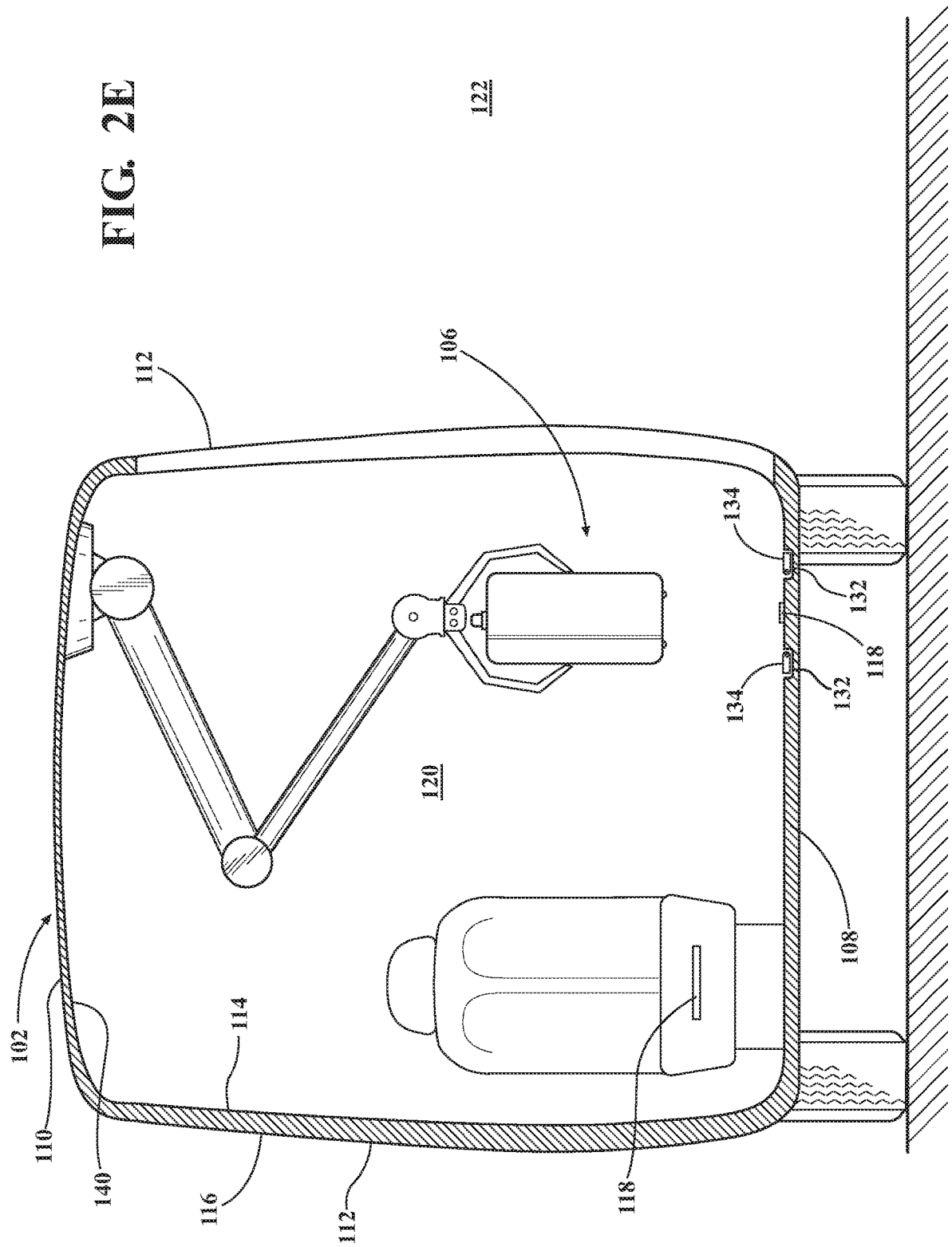

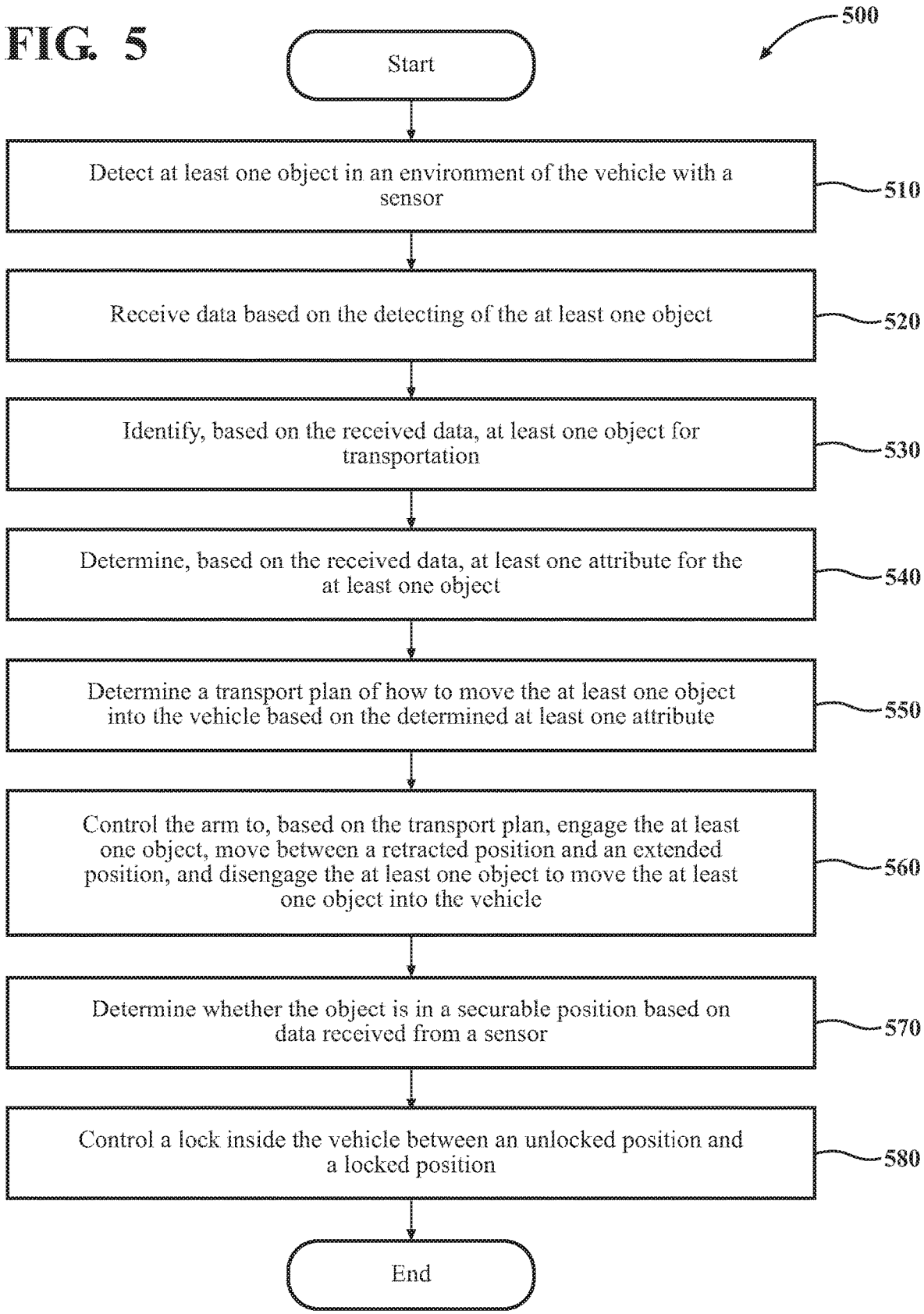

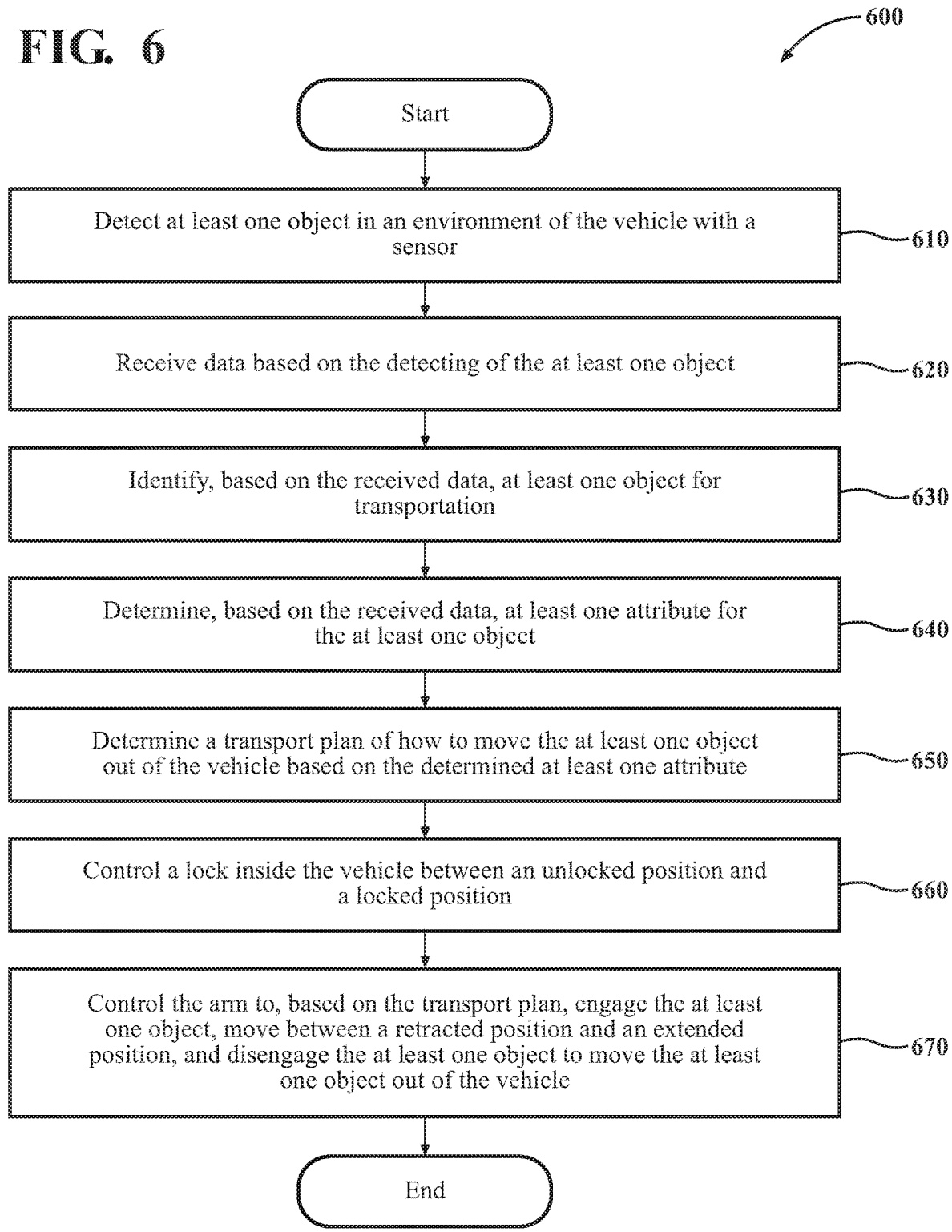

SYSTEMS AND METHODS FOR TRANSPORTING AN OBJECT INTO AND OUT OF A VEHICLE

TECHNICAL FIELD

The subject matter described herein relates, in general, to systems and methods for transporting an object into or out of a vehicle.

BACKGROUND

Moving an object (e.g., a person, luggage, etc.) into or out of a vehicle sometimes requires human intervention. For example, certain people, such as the elderly and small children, may only be able to enter/exit a vehicle with the assistance of another person. Similarly, objects such as a suitcase, a wheelchair, groceries, etc. are ordinarily loaded into or unloaded from the vehicle with the assistance of a person. A person attempting to move an object into or out of a vehicle may have to be in suitable physical shape or they may be unable to provide the assistance.

Further, a person may not always be available to provide assistance to an object being transported into or out of a vehicle. For example, with the advancement of driverless vehicles, an object to be transported into a driverless vehicle may require a person's assistance, but there may be no assistance available.

SUMMARY

In one embodiment, a system for transporting an object into a vehicle is disclosed. The system includes a sensor configured to detect a plurality of objects in an environment of the vehicle, an arm mounted to the vehicle and movable between a retracted position inside the vehicle and an extended position outside the vehicle, a processor operatively connected to the arm, and a memory communicably coupled to the processor. The memory stores an object identification module including instructions that, when executed by the processor, cause the processor to, based on data received from the sensor, identify at least one object for transportation and determine at least one attribute for the at least one object. The memory also stores a planning module including instructions that, when executed by the processor, cause the processor to determine a transport plan of how to move the at least one object into the vehicle based on the determined at least one attribute. The memory also stores an arm control module including instructions that, when executed by the processor, cause the processor to, based on the transport plan, control the arm to move from the retracted position to the extended position, engage the at least one object, move from the extended position to the retracted position, and disengage the at least one object to move the at least one object into the vehicle.

In one embodiment, a system for transporting an object out of a vehicle is disclosed. The system includes a sensor configured to detect a plurality of objects in an environment of the vehicle, an arm mounted to the vehicle and movable between a retracted position inside the vehicle and an extended position outside the vehicle, a processor operatively connected to the arm, and a memory communicably coupled to the processor. The memory stores an object identification module including instructions that, when executed by the processor, cause the processor to, based on data received from the sensor, identify at least one object for transportation and determine at least one attribute for the at least one object. The memory also stores a planning module including instructions that, when executed by the processor, cause the processor to determine a transport plan of how to move the at least one object out of the vehicle based on the determined at least one attribute. The memory also stores an arm control module including instructions that, when executed by the processor, cause the processor to, based on the transport plan, control the arm to engage the at least one object, move from the retracted position to the extended position, and disengage the at least one object to move the at least one object out of the vehicle.

In one embodiment, a system for transporting an object into and out of a vehicle is disclosed. The system includes a sensor configured to detect a plurality of objects in an environment of the vehicle, an arm mounted to the vehicle and movable between a retracted position inside the vehicle and an extended position outside the vehicle, a processor operatively connected to the arm, and a memory communicably coupled to the processor. The memory stores an object identification module including instructions that, when executed by the processor, cause the processor to, based on data received from the sensor, identify at least one object for transportation and determine at least one attribute for the at least one object. The memory also stores a planning module including instructions that, when executed by the processor, cause the processor to determine a transport plan of how to move the at least one object into and out of the vehicle based on the determined at least one attribute. The memory also stores an arm control module including instructions that, when executed by the processor, cause the processor to, based on the transport plan, control the arm to move from the retracted position to the extended position, engage the at least one object, move from the extended position to the retracted position, and disengage the at least one object to move the at least one object into the vehicle. The arm control module also includes instructions that, based on the transport plan, control the arm to engage the at least one object, move from the retracted position to the extended position, and disengage the at least one object to move the at least one object out of the vehicle.

In one embodiment, a method for transporting an object into a vehicle using an arm mounted to the vehicle and movable between a retracted position inside the vehicle and an extended position outside the vehicle is disclosed. The method includes detecting a plurality of objects in an environment of the vehicle with a sensor, and identifying, based on data received from the sensor, at least one object for transportation. The method also includes determining, based on the data received from the sensor, at least one attribute for the at least one object, and determining a transport plan of how to move the at least one object into the vehicle based on the determined at least one attribute. The method also includes, based on the transport plan, controlling the arm to move from the retracted position to the extended position, to engage the at least one object, move from the extended position to the retracted position, and disengage the at least one object to move the at least one object into the vehicle.

In one embodiment, a method for transporting an object out of a vehicle using an arm mounted to the vehicle and movable between a retracted position inside the vehicle and an extended position outside the vehicle is disclosed. The method includes detecting a plurality of objects in an environment of the vehicle with a sensor, and identifying, based on data received from the sensor, at least one object for transportation. The method also includes determining, based on the data received from the sensor, at least one attribute for the at least one object, and determining a transport plan of how to move the at least one object out of the vehicle based on the determined at least one attribute. The method also includes, based on the transport plan, controlling the arm to engage the at least one object, move from the retracted position to the extended position, and disengage the at least one object to move the at least one object out of the vehicle.

In one embodiment, a method for transporting an object into and out of a vehicle using an arm mounted to the vehicle and movable between a retracted position inside the vehicle and an extended position outside the vehicle is disclosed. The method includes detecting a plurality of objects in an environment of the vehicle with a sensor, and identifying, based on data received from the sensor, at least one object for transportation. The method also includes determining, based on the data received from the sensor, at least one attribute for the at least one object, and determining a transport plan of how to move the at least one object into and out of the vehicle based on the determined at least one attribute. The method also includes, based on the transport plan, controlling the arm to move from the retracted position to the extended position, engage the at least one object, move from the extended position to the retracted position, and disengage the at least one object to move the at least one object into the vehicle. The method also includes, based on the transport plan, controlling the arm to engage the at least one object, move from the retracted position to the extended position, and disengage the at least one object to move the at least one object out of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 2A-2G illustrate various positions of the robotic arm as it lifts an object into the vehicle.

FIG. 5 illustrates one embodiment of a flow diagram of a method for transporting an object into a vehicle.

FIG. 6 illustrates one embodiment of a flow diagram of a method for transporting an object out of a vehicle.

DETAILED DESCRIPTION

Figure 1A:
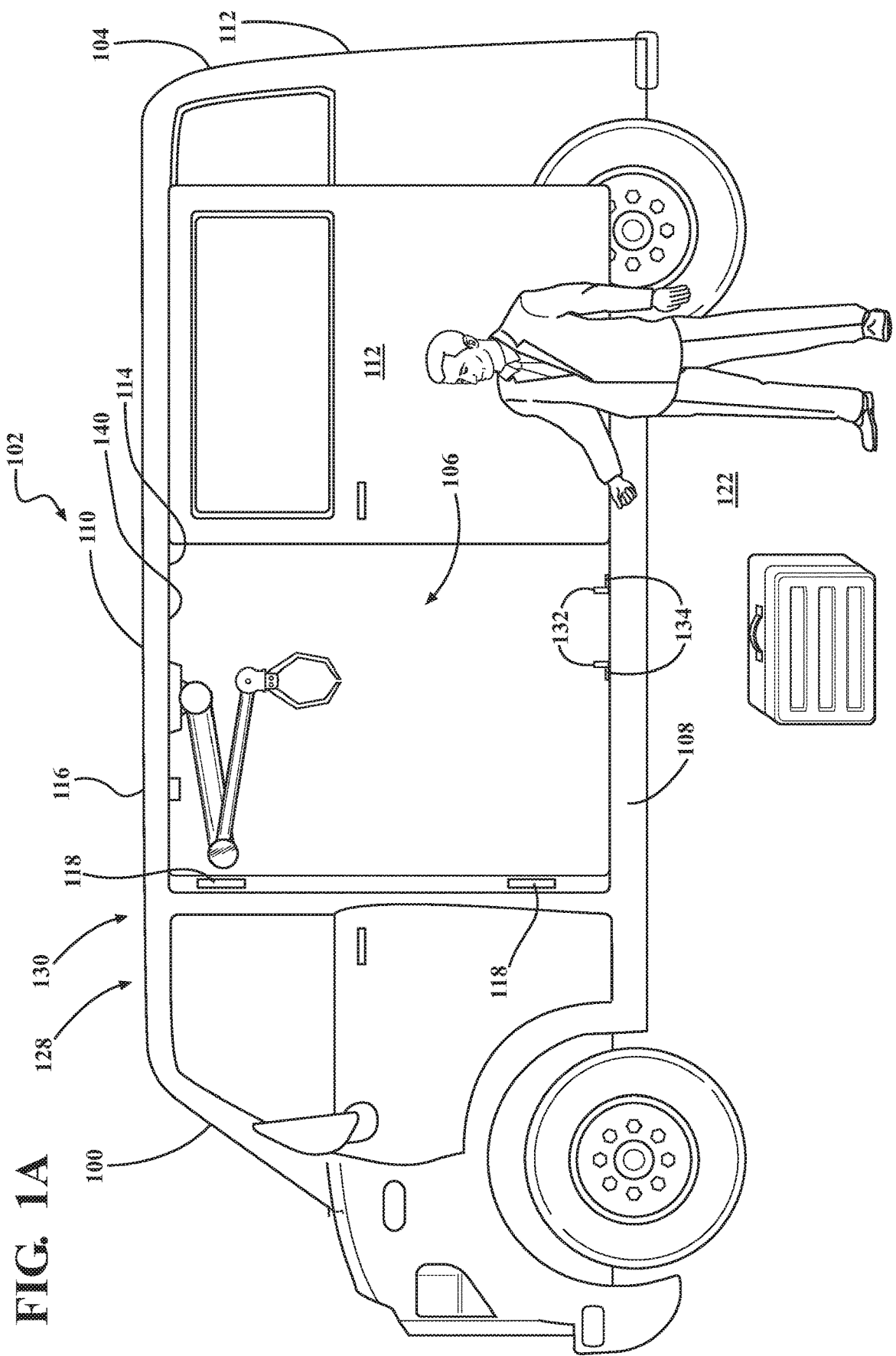
FIG. 1A is a side view of a vehicle in which systems and methods for transporting an object into or out of the vehicle may be implemented.

Systems, methods, and other embodiments associated with a manner of transporting an object into and/or out of a vehicle are disclosed. As noted, a person may not always be available to move an object into or out of a vehicle. For example, with the advancement of driverless vehicles, an object that needs to be picked up by a driverless vehicle may require another person's assistance, but there may be no assistance available. As another example, even though a person is available, the person may be incapable of moving the object into or out of the vehicle. For example, a person may be unable to move the object because of the size or weight of the object.

Some vehicles may have ramps to facilitate moving objects into and out of the vehicles. However, such ramps may not lift and move an object that is located outside the vehicle to inside the vehicle. Similarly, such ramps may not move an object that is located inside the vehicle to outside the vehicle.

Accordingly, in one embodiment, the disclosed approach uses an object transport control system that controls an arm mounted on the vehicle to lift and move an object from outside a vehicle to inside the vehicle and/or from inside the vehicle to outside the vehicle.

For example, a passenger may request transportation using an app on the passenger's device, which may create a travel request record. The travel request record may include the passenger's identification, the passenger's belongings that are to be picked up, an originating location and a destination. In such an example, when the vehicle arrives at the originating location or destination, the object transport system may detect and identify the passenger and the passenger's belongings based on one or more sensors and the description in the travel request record. Upon detecting and identifying a passenger and the passenger's belongings, the object transport system may automatically move the passenger and the passenger's belongings, using the arm, into or out of the vehicle.

As another example, a user may request delivery of an object using a delivery service. The delivery service may record the delivery request as a delivery request record in a database. Similar to the travel request record, the delivery request record may include identifying information about the object, the originating location, and destination. Upon the vehicle arriving at the originating location or the destination, the object transport system may detect the object scheduled for pick-up or drop-off based on one or more sensors and the description in the delivery request record.

In addition to automatically moving the passenger and the passenger's belongings, the object transport system may secure the passenger and the passenger's belongings inside the vehicle. As an example, the object transport system may activate a seatbelt to extend across and fasten in the passenger. As another example, the object transport system may activate locks located in the floor of the vehicle to extend from the floor and secure the passenger's belongings.

FIG. 1A illustrates an example of a vehicle 100. The vehicle 100 includes an object transport system 102 that transports an object into and/or out of a vehicle 100. As used herein, a "vehicle" is any form of motorized transport. Although illustrated as a van, the vehicle 100 may include any passenger or commercial automobile such as a sedan, a sport utility vehicle, a crossover vehicle, a truck, a minivan, a bus, etc.

The vehicle 100 may include a vehicle body 104 defining a vehicle cabin 106 to house occupants, if any, in the vehicle 100. The vehicle body 104 may include a floor 108, a roof 110 and a plurality of sides 112 extending from the floor 108 to the roof 110. The vehicle body 104 may include an interior surface 114 and an exterior surface 116.

The vehicle 100 may include sensors 118 configured to detect at least one object in an internal environment 120 or an external environment 122 of the vehicle 100. The sensors 118 may be mounted in any suitable location on the vehicle body 104. For example, the sensors 118 may be mounted on the interior surface 114 of the vehicle or on the exterior surface 116 of the vehicle. The sensors 118 are described in more detail below in connection with FIG. 3.

The vehicle 100 includes an object transport system 102 for, as described above, moving an object into or out of the vehicle 100. The object transport system 102 includes an arm 124, arm actuators 126 and an object transport control system 128. The arm 124 extends from a first end 136 to a second end 138 and is mounted to the vehicle 100 at the first end 136. In a first example, the arm 124 may be mounted inside the vehicle 100. As shown in FIG. 1A, the arm 124 may be mounted on a ceiling 140 of the vehicle 100. In another embodiment, the arm 124 may be mounted to the floor 108 of the vehicle 100. In other embodiments, the arm 124 may be mounted outside the vehicle 100. The arm 124 may be mounted on top of the vehicle 100. Alternatively, the arm 124 may be mounted under the vehicle 100.

Figure 1B:
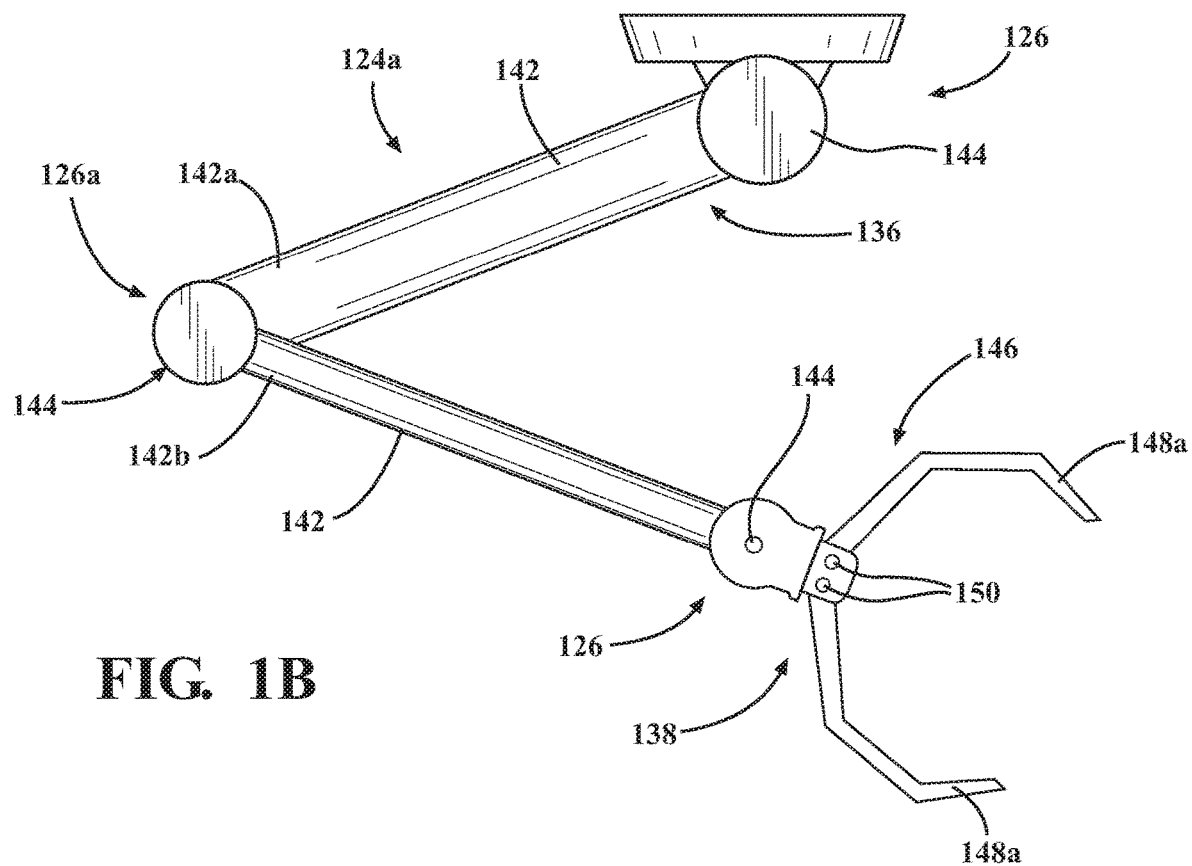
FIG. 1B illustrates one embodiment of a robotic arm used in the vehicle of FIG. 1A.

FIG. 1B illustrates one embodiment of the arm 124. The arm 124 may include a plurality of rigid segments 142 joined by actuatable joints 144, which may be controlled by the arm actuators 126. The actuatable joints 144 can enable rotational movement between the rigid segments 142 of the arm 124. The actuatable joints 144 can enable the arm 124 to have upwards of six degrees of freedom of motion.

Figure 1C:
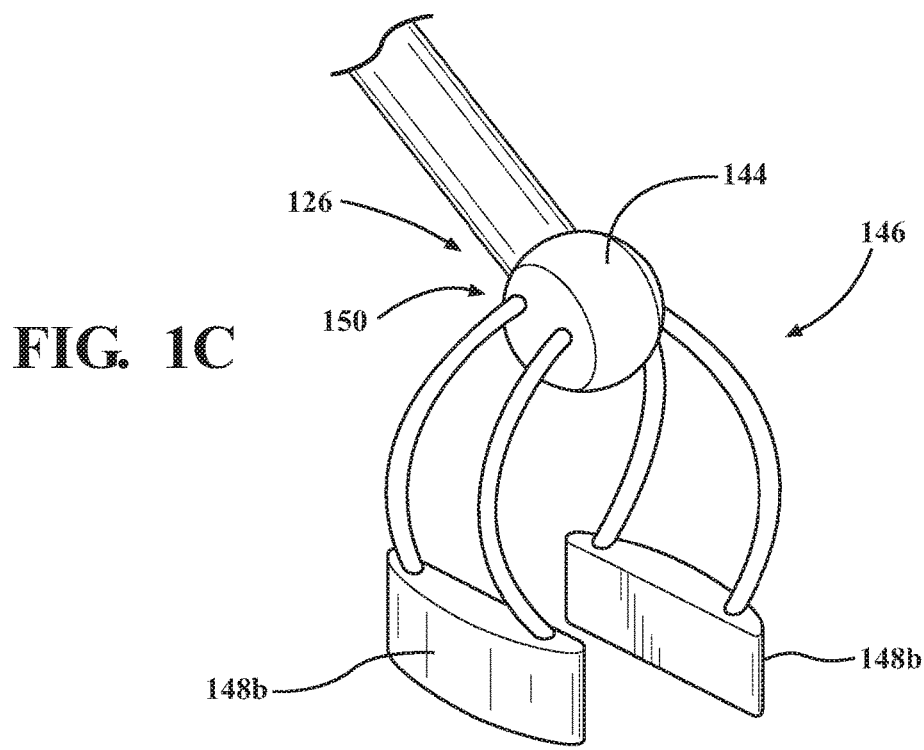
FIG. 1C illustrates another embodiment of a robotic arm used in the vehicle of FIG. 1A.

The arm 124 may include a grip 146, which is coupled to the second end 138 of the arm 124 via one of the actuatable joints 144. The grip 146 may include two opposing segments. As an example and as shown in FIG. 1B, the grip 146 can include at least one pair of opposing fingers 148a that are rotatably coupled to the grip 146 as well as grip actuators 150 for controlling the pair of opposing fingers 148a. The fingers 148a can support gripping, twisting, etc. actions by the grip 146. FIG. 1C illustrates one embodiment of the arm 124. As another example and as shown in FIG. 1C, the grip 146 can include at least one pair of opposing panels 148b that are rotatably coupled to the grip 146 as well as grip actuators 150 for controlling the pair of opposing panels 148b. Similar to the fingers 148a, the panels 148b may support gripping, twisting, etc. actions by the grip 146.

In another embodiment, the arm 124 may include a scoop (not shown), which is coupled to the second end 138 of the arm 124 via one of the actuatable joints 144. In such an embodiment, the arm 124 may extend from the vehicle 100 and a portion of the scoop may move under the object until the object is in the scoop. Then, the arm 124 and the scoop may ascend, raising the object and moving the object into the vehicle 100. To move an object out of the vehicle 100, the scoop may move under the object until the object is in the scoop and then, the arm 124 and the scoop may ascend, raising the object and moving the object out of the vehicle 100.

In another embodiment, the arm 124 may include a platform (not shown), which is coupled to the second end 138 of the arm 124 via one of the actuatable joints 144. The platform may be movable between a lowered position, where the platform is generally at ground level outside the vehicle, and a raised position, where the platform is above ground level. The platform may have a guardrail along at least one of the platform's edges. The guardrail may be coupled to the platform and movable between a folded position, where the guardrail is folded down and resting on the platform, and an upright position, where the guardrail is generally at a right angle to the platform.

In another embodiment, the grip 146 may be interchangeable between opposing fingers 148a, opposing panels 148b, a scoop, a platform and any other suitable mechanism.

The arm 124 is movable between a retracted position inside the vehicle 100 and an extended position outside the vehicle 100. In the retracted position, the second end 138 of the arm 124 is inside the cabin of the vehicle 100. In the case where the arm 124 is mounted inside the vehicle 100, and the arm 124 is in the retracted position, the whole arm 124 may be inside the vehicle 100. In a case where the arm 124 is mounted outside the vehicle 100 and the arm 124 is in the retracted position, a first portion of the arm 124, proximate to the first end 136, may be outside the vehicle 100 and a second portion of the arm 124 may be inside the vehicle 100. Alternatively, where the arm 124 is mounted outside the vehicle 100 and the arm 124 is in the retracted position, the whole arm 124 may be outside the vehicle 100 and as an example, above the roof 110 of the vehicle 100. For example, if the arm 124 is mounted on the roof 110 of the vehicle 100, the whole arm 124 may be outside and above the roof 110 of the vehicle 100. In the extended position, the second end 138 of the arm 124 extends away from and outside of the vehicle 100.

Returning to FIG. 1A, the object transport system 102 may include a securing system 130, having one or more locks 132 and one or more lock actuators 134. The locks 132 may be fixed inside the vehicle 100 and movable between an unlocked position and a locked position. As an example, the locks 132 may be fixed to the floor 108 of the vehicle 100, as shown in FIG. 1A. As another example (not shown), the lock 132 may be fixed to the side 112 of the vehicle 100. In the unlocked position, the lock 132 may be open to receive a portion of an object. When the lock 132 moves into the locked position, the lock 132 closes and engages the portion of the object to, restrict the object from moving.

The arm actuators 126, grip actuators 150 and lock actuators 134 can be any element or combination of elements operable to adjust one or more of the arm 124, grip 146 and lock 132 or their components thereof respectively, responsive to receiving signals or other inputs from the object transport control system 128. Any suitable actuator can be used. For instance, the actuators can include motors, pneumatic actuators, hydraulic pistons, relays, solenoids, and/or piezoelectric actuators, just to name a few possibilities.

In some embodiments, the vehicle 100 may include a second arm. In these embodiments, the arm 124 and the second arm may transport objects together or independently. Similar to the arm 124, the second arm may be mounted inside or outside the vehicle 100. Further, the second arm typically has features in common with the arm 124 and therefore will not be described further to avoid redundancy.

In some embodiments, the vehicle 100 may also include a ramp (not shown), extending from the vehicle 100 outwards. In such a case, the arm 124 may extend from the vehicle 100, engage the object (e.g., a wheelchair) and guide the object to the ramp by, for example, pulling or pushing the wheelchair. The arm 124 may then move the wheelchair up or down the ramp, as is needed.

In some embodiments, the vehicle 100 may also include a staircase (not shown), extending from the vehicle 100 outwards. In such a case, the arm 124 may extend from the vehicle 100, engage the object (e.g., an elderly person) and guide the object to the staircase by, for example, moving at a suitable pace. The arm 124 may move with the object up or down the staircase at a suitable pace.

The description of possible elements of the vehicle 100 shown in FIG. 1A will be described along with subsequent figures. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 2B:
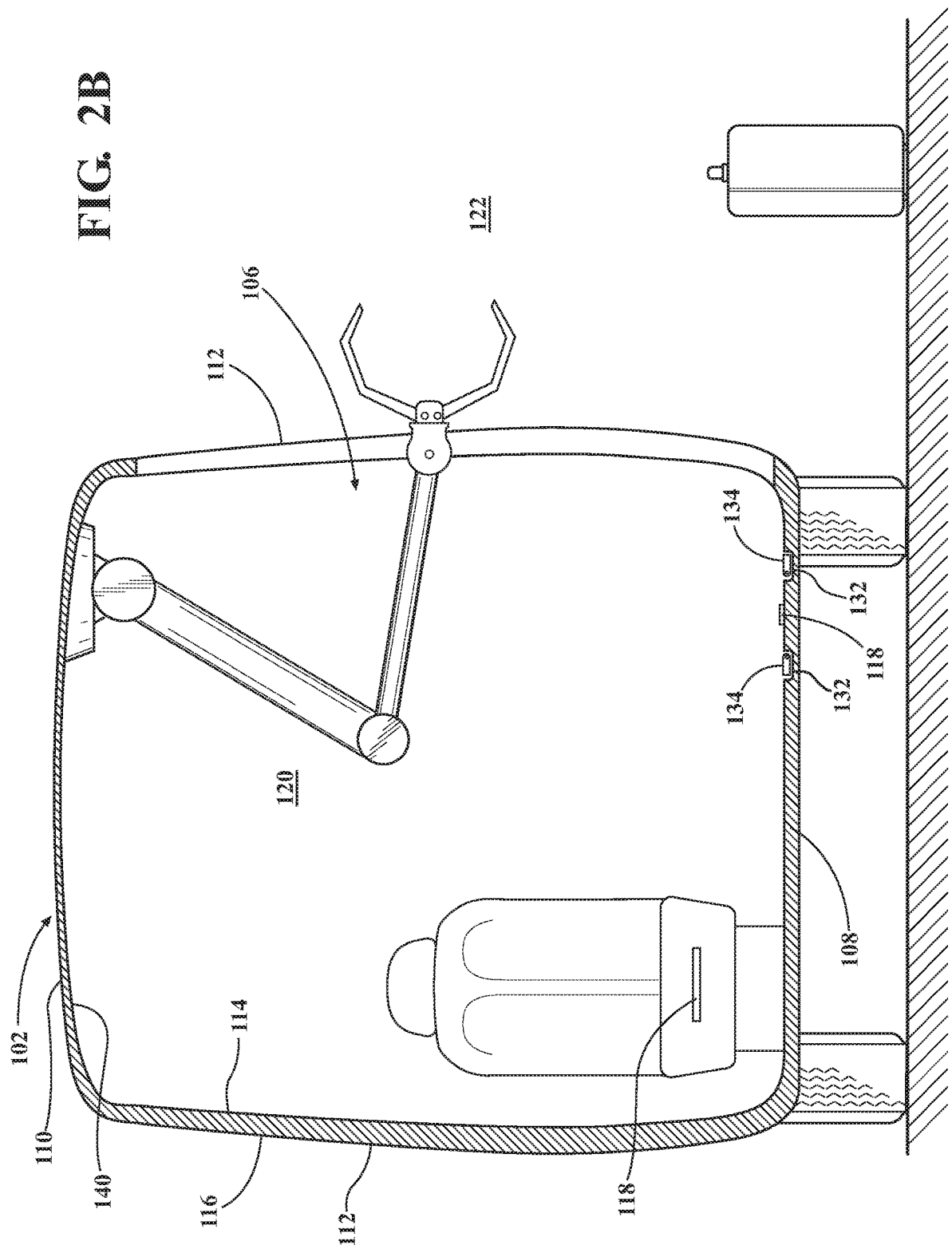
Figure 2F:
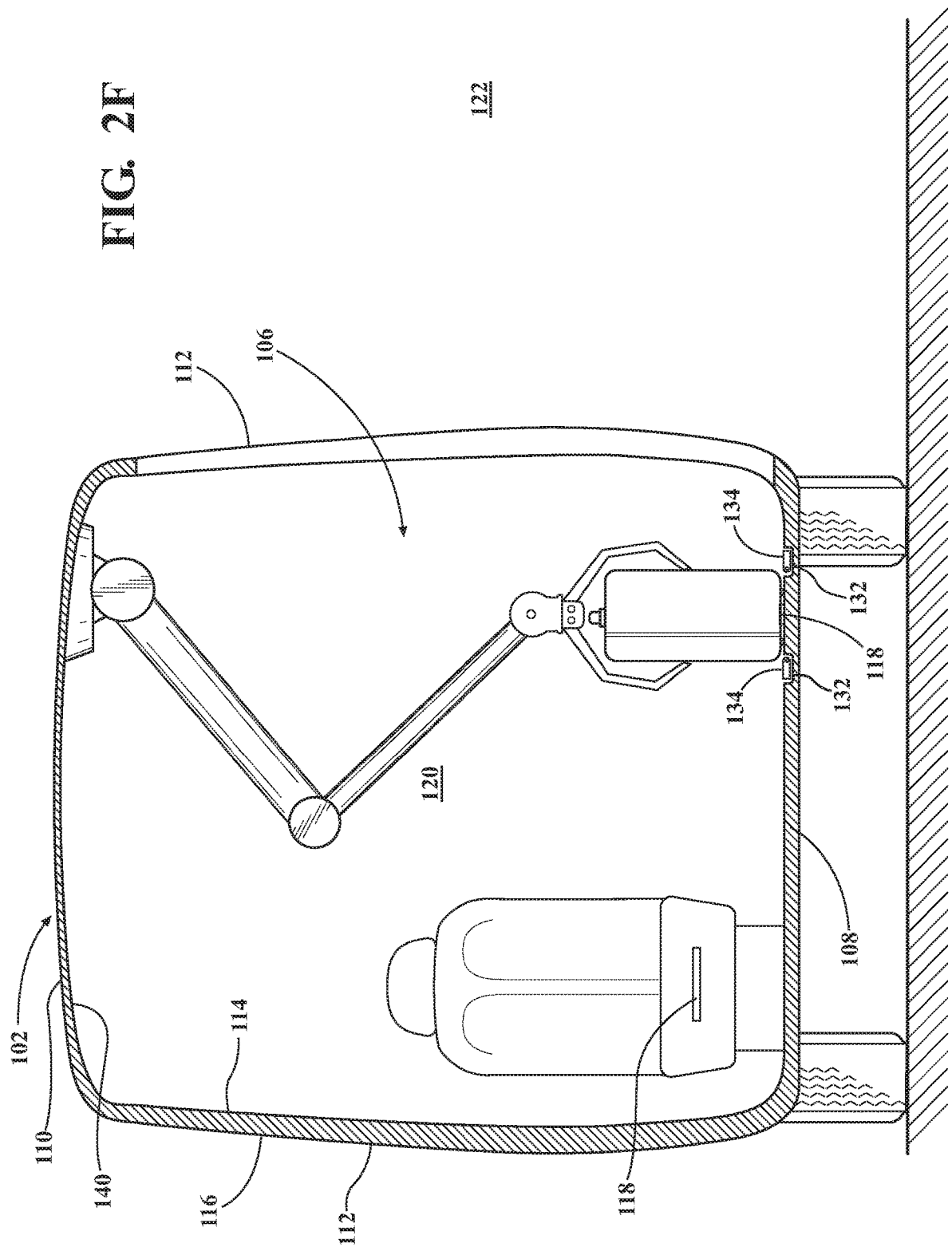
Figure 2G:
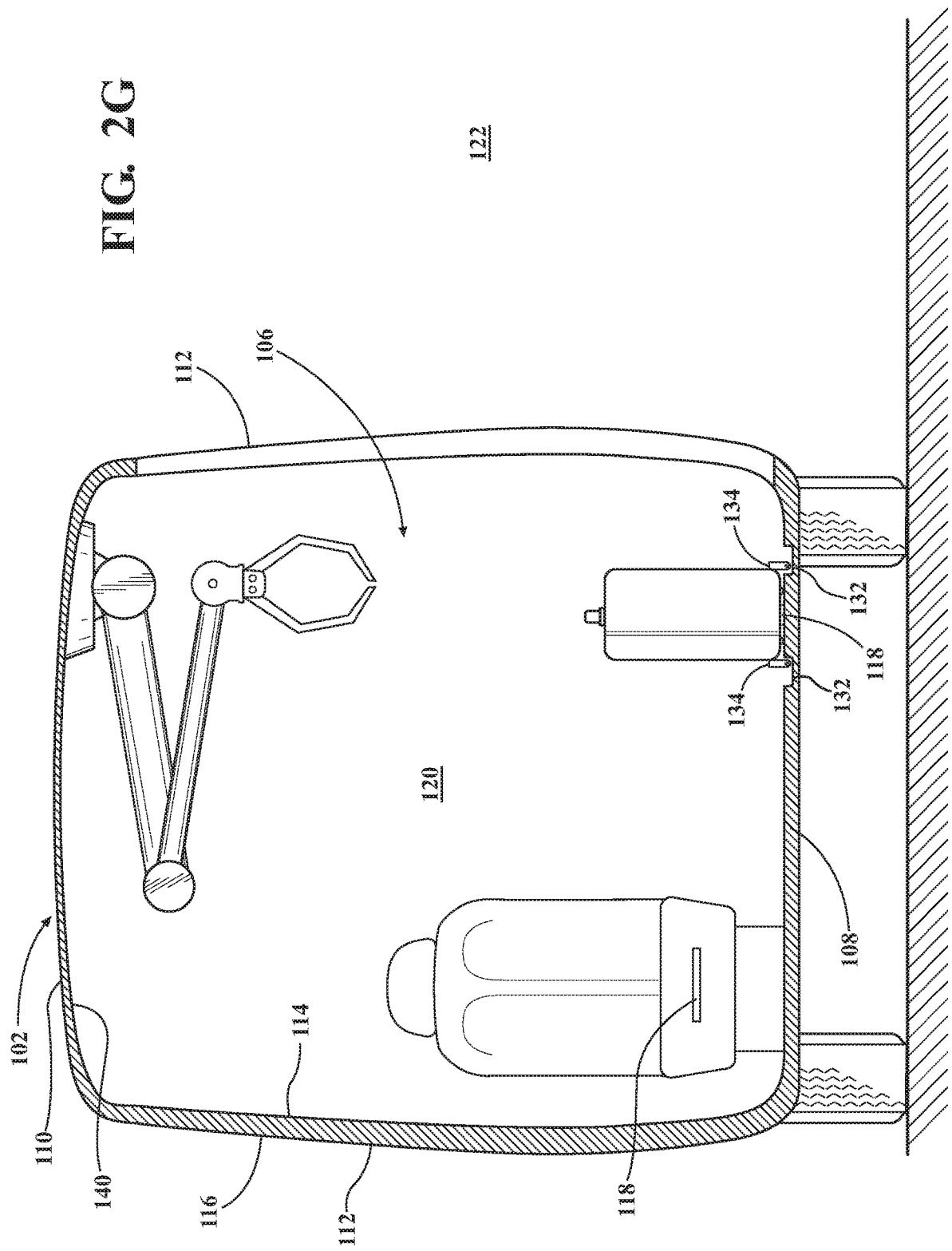

FIGS. 2A-2G illustrate various positions of the arm 124 in an example process where the object transport system 102 transports an object from outside of the vehicle 100 to inside of the vehicle 100. In FIG. 2A, the arm 124 is retracted and inside the vehicle 100. In FIG. 2B, the object transport system 102 detects an object outside of the vehicle 100 and extends the arm 124 to outside the vehicle 100. In FIG. 2C, the arm 124 is lowered till it is in contact with and grips the object. In FIG. 2D, the arm 124 lifts the object higher than the floor level of the vehicle 100. In FIG. 2E, the arm 124 transports the object into the vehicle 100. In FIG. 2F, the arm 124 lowers the object into a desired location within the vehicle 100. In FIG. 2G, the arm 124 disengages from the object and returns to its retracted position. Locks 132 in the floor 108 of the vehicle 100 may then secure the object.

Figure 3:
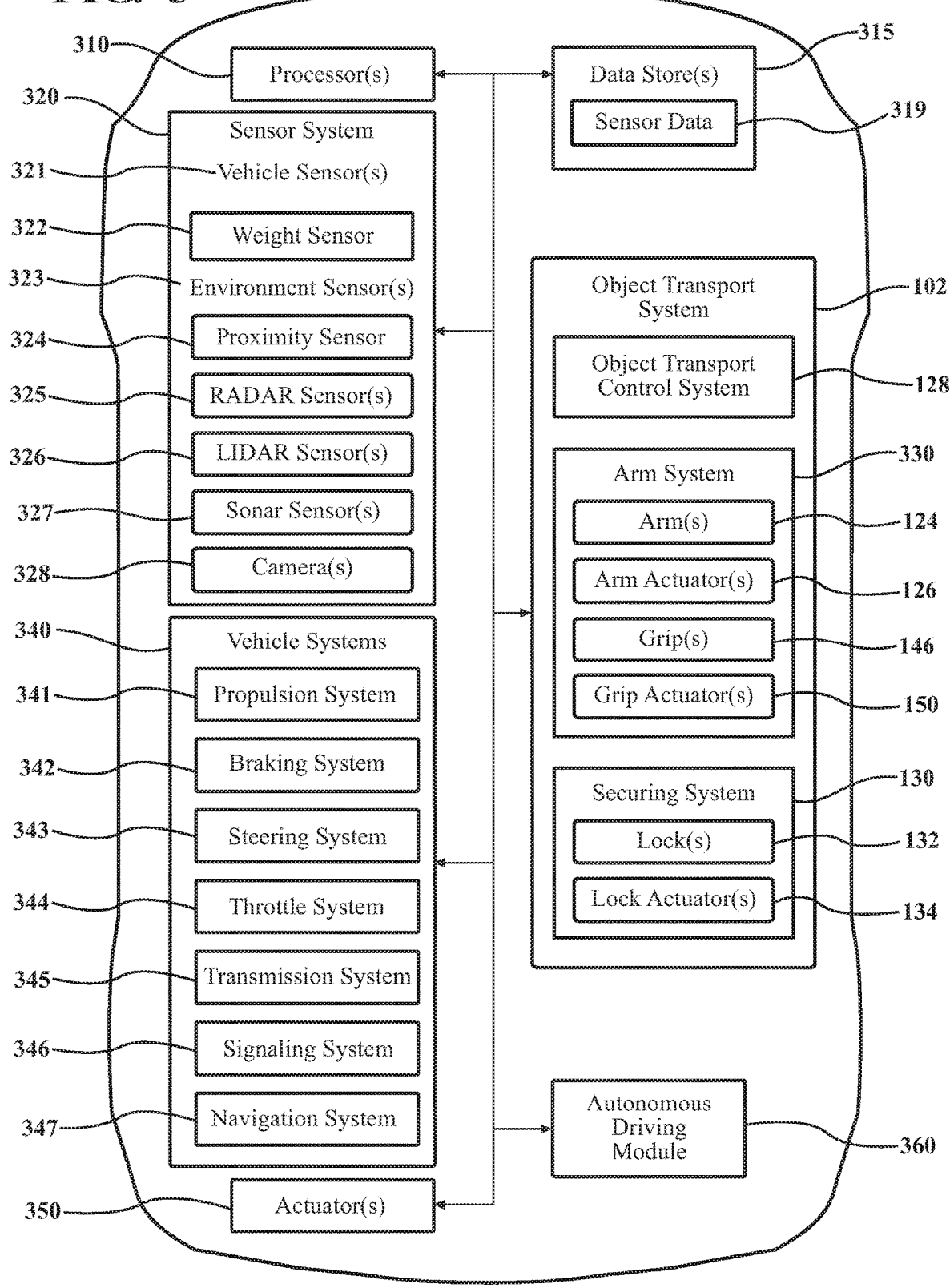
FIG. 3 illustrates one embodiment of a vehicle within which systems and methods disclosed herein may be implemented.

Referring to FIG. 3, an example of a vehicle 100 is illustrated. The vehicle 100 includes a sensor system 320 and object transport system 102. The vehicle 100 also includes various elements. It will be understood that in various embodiments it may not be necessary for the vehicle 100 to have all of the elements shown in FIG. 3. The vehicle 100 can have any combination of the various elements shown in FIG. 3. Further, the vehicle 100 can have additional elements to those shown in FIG. 3. In some arrangements, the vehicle 100 may be implemented without one or more of the elements shown in FIG. 3. While the various elements are shown as being located within the vehicle 100 in FIG. 3, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 3 and will be described along with subsequent figures. However, a description of many of the elements in FIG. 3 will be provided after the discussion of FIGS. 4-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the sensor system 320 may include one or more sensors 118. "Sensor" means any device, component and/or system that can detect, determine, assess, monitor, measure, quantify and/or sense something. The one or more sensors 118 can be configured to detect, determine, assess, monitor, measure, quantify and/or sense in real-time. As used herein, the term "real-time" means a level of processing responsiveness that a user or system senses as sufficiently immediate for a particular process or determination to be made, or that enables a processor 310 to execute an external process.

In arrangements in which there are a plurality of sensors 118, the sensors 118 can work independently from each other. Alternatively, two or more of the sensors 118 can work in combination with each other. In such case, the two or more sensors 118 can form a sensor network. The sensors 118 can be operatively connected to the object transport control system 128, and/or other elements of the vehicle 100. The sensors 118 can include any suitable type of sensor. Various examples of different types of sensors 118 will be described herein. However, it will be understood that the embodiments are not limited to the particular sensors described.

The sensors 118 in the sensor system 320 can include one or more proximity sensors 324, one or more radar sensors 325, one or more LIDAR sensors 326, one or more sonar sensors 327, and/or one or more cameras 328. The sensors 118 may acquire sensor data 319 in various forms such as still images, video, point clouds, and so on. As an example, the camera 328 may acquire a video of the internal environment 120 and the external environment 122 of the vehicle 100, which may include at least one object. As another example, the video may include images of any users proximate to the vehicle 100. In one or more arrangements, the one or more cameras 328 can be high dynamic range (HDR) cameras or infrared (IR) cameras.

The sensor system 320 can include one or more weight sensors 322 for detecting objects in the internal environment 120 of the vehicle 100. The weight sensors 322 may be located in a seat in the vehicle 100. Additionally, the weight sensors 322 may be located in the floor 108 of the vehicle 100. In either case, the weight sensors 322 can be configured to detect a weight of an object proximate to the weight sensor 322.

The object transport system 102 may include an arm system 330, the securing system 130 and the object transport control system 128.

The arm system 330 may include one or more arms 124 and arm actuators 126, configured to control movement of the one or more arms 124. The arm system 330 may further include one or more grips 146 and grip actuators 150, configured to control movement of the one or more grips 146.

As previously mentioned, the securing system 130 includes one or more locks 132 and lock actuators 134, configured to control movement of the one or more locks 132.

The object transport control system 128 is configured to control the arm system 330 and the securing system 130 as disclosed herein.

Some of the possible elements of the vehicle 100 will be described along with subsequent figures. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 4:
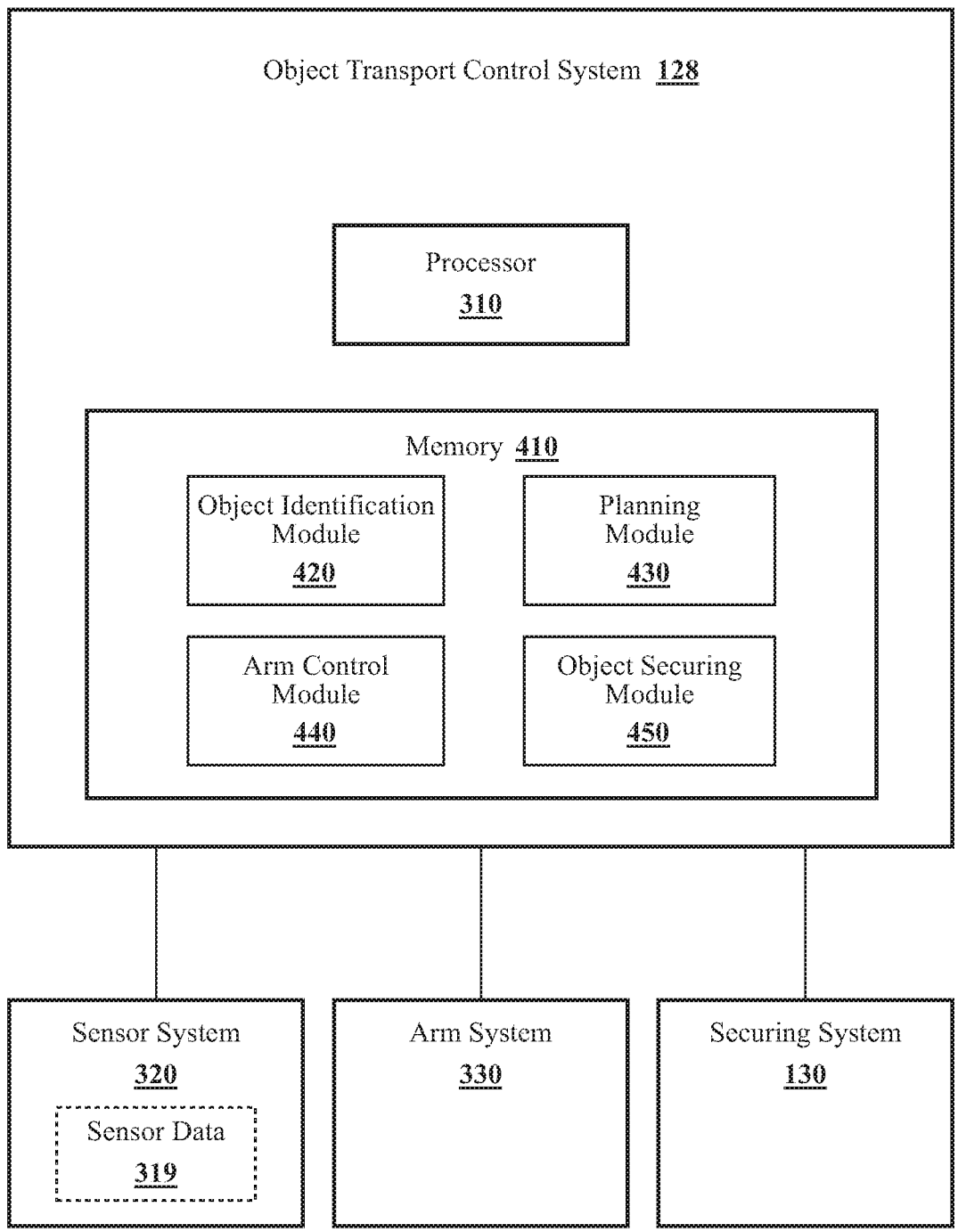
FIG. 4 illustrates one embodiment of an object transport system that is associated with transporting an object into or out of a vehicle.

With reference to FIG. 4, one embodiment of the object transport control system 128 of FIG. 3 is further illustrated. The object transport control system 128 is shown as including a processor 310 from the vehicle 100 of FIG. 3.

Accordingly, the processor 310 may be a part of the object transport control system 128, the object transport control system 128 may include a separate processor from the processor 310 of the vehicle 100, or the object transport control system 128 may access the processor 310 through a data bus or another communication path. In either case, it is generally understood that the processor 310 is a microprocessor or other electronic processing device that is configured with computing resources capable of performing the functions (e.g., executing machine learning algorithms) disclosed herein.

In one embodiment, the object transport control system 128 includes a memory 410 that stores an object identification module 420, a planning module 430, and an arm control module 440. The object transport control system 128 may also include an object securing module 450. The memory 410 is a random-access memory (RAM), read-only memory (ROM), a hard disk drive, a flash memory, or other suitable memory for storing the object identification module 420, the planning module 430, the arm control module 440, and the object securing module 450. The object identification module 420, the planning module 430, the arm control module 440, and the object securing module 450 are, for example, computer-readable instructions that when executed by the processor 310 cause the processor 310 to perform the various functions disclosed herein.

In one embodiment, the object identification module 420 generally includes instructions that function to control the processor 310 to receive data from the sensor system 320. The object identification module 420 may, based on data received from the sensor system 320, identify at least one object for transportation and determine at least one attribute for the at least one object.

The object identification module 420 may receive data from the sensor system 320 in the form of, as an example, an image of the at least one object and a distance from the vehicle 100 to the at least one object. The object identification module 420 may receive data continuously from the sensor system 320 or it may receive data from the sensor system 320 when the vehicle 100 is stationary. Based on the received data, the object identification module 420 may determine at least one attribute of the object. An attribute is any physical property of the object. As such, the attribute may be one of a weight of the object, dimensions of the object, a surface material of the object, a type of the object, and a position of the object relative to the vehicle 100. Based on the attributes, the object identification module 420 may determine what an object is and whether the object is living or non-living.

In one or more arrangements, the object identification module 420 can include artificial or computational intelligence elements, e.g., neural network, fuzzy logic or other machine learning algorithms. As one example, the object identification module 420 may use machine learning techniques in which objects and their related attributes can be provided to a machine learning program for training the object identification module 420. As another example, the object identification module 420 may include an object identification database that identifies objects and their related attributes. In such an example, the object identification module 420 may compare the attributes received from the sensor 118 to attributes in the object identification database to determine what an object is.

As an example, the object identification module 420 may determine an object is a person, an animal, box or a suitcase. As a further example, the object identification module 420 may determine the person is standing, sitting in a wheelchair, or lying on a stretcher.

The planning module 430 generally includes instructions that function to control the processor 310 to determine a transport plan of how to move the object into and/or out of the vehicle 100 based on the object's attributes.

The planning module 430 determines, based on the object's attributes, whether the arm 124 is capable of moving the object. In other words, the planning module 430 may compare the at least one attribute of the object to a predetermined value, and determine a transport plan when the attribute of the object compares favorably with the predetermined value. As an example and in the case of moving an object into the vehicle 100, the planning module 430 may compare the distance between the object and the vehicle 100 to the reach of the fully extended arm 124, and if the distance between the object and the vehicle 100 is within the reach of the fully extended arm 124, the planning module 430 may determine a transport plan. However, if the distance between the object and the vehicle 100 exceeds the reach of the fully extended arm 124, the planning module 430 may notify a driver, in the case of a manual vehicle or an autonomous vehicle so that the driver or the autonomous vehicle may determine whether to move the vehicle 100 such that the object is within the reach of the extended arm 124.

As another example and in the case of moving an object out of the vehicle 100, the planning module 430 may determine whether the object in the vehicle 100 is accessible to the arm 124. If the object inside the vehicle 100 is accessible to the arm 124, the planning module 430 may determine a transport plan. Otherwise, the planning module 430 may notify the driver or the autonomous vehicle that the object in the vehicle 100 is inaccessible and based on that information, the driver or the autonomous vehicle may move the object within the vehicle 100 such that the object is accessible to the arm 124.

As another example when moving an object out of the vehicle 100, the planning module 430 may determine whether a suitable location to place the object outside the vehicle 100 is within the reach of the fully extended arm 124. If there is a suitable location to place the object outside the vehicle 100, the planning module 430 may determine a transport plan. Otherwise, as noted above, the planning module 430 may notify the driver and/or autonomous vehicle that there is no suitable location outside the vehicle 100 for the arm 124 to place the object and based on that information, the driver or the autonomous vehicle may move the vehicle 100 to a more suitable location.

As another example, the planning module 430 may determine a transport plan if the weight of the object does not exceed a weight limit of the arm 124 and the dimensions of the objects do not exceed a wingspan of the grip 146.

A transport plan for moving an object into the vehicle may include a sequence of movements of the arm 124. For example, the arm 124 may be in the retracted position inside the vehicle 100, and the transport plan may include (1) extending the arm 124 outside the vehicle 100, (2) engaging the arm 124 with the object, (3) the arm 124 lifting the object, (4) the arm 124 moving the object into the vehicle 100, (5) the arm 124 placing the object in a predetermined position inside the vehicle 100, and (6) the arm 124 releasing the object.

A transport plan for moving an object out of the vehicle 100 may include a sequence of movements of the arm 124. For example, the arm 124 may be in the retracted position inside the vehicle 100, and the transport plan may include (1) extending the arm 124 toward the object inside the vehicle 100, (2) engaging the arm 124 with the object, (3) the arm 124 lifting the object, (4) the arm 124 moving the object out of the vehicle 100, (5) the arm 124 placing the object at a predetermined position outside the vehicle 100, and (6) the arm 124 releasing the object.

The transport plan may include a sequence of movements based on navigating barriers while the arm 124 is moving. As an example, if multiple objects are inside the vehicle 100, the transport plan may include a sequence of movements of the arm 124 that navigates around multiple objects, so as to avoid a collision, to place an object inside the vehicle 100 or gain access to an object that is to be moved out of the vehicle 100. Similarly and as another example, if multiple objects are outside the vehicle 100, the transport plan may include a sequence of movements of the arm 124 that navigates around multiple objects, so as to avoid a collision, to place an object outside the vehicle 100 or gain access to an object that is to be moved into the vehicle 100.

The sequence of movements may include a positioning of the arm 124, more specifically, the positioning of the rigid segments 142 of the arm 124 and the angles between the rigid segments 142 at the joining actuatable joints 144. As an example, the planning module 430 may determine the positioning of the rigid segments 142 based on ensuring that the arm 124 and the object are able to move from the outside 122 of the vehicle 100 to the inside 120 of the vehicle 100 through a vehicle opening without either the arm 124 or the object colliding with an edge of the vehicle opening. As another example, the planning module 430 may determine the positioning of the rigid segments 142 based on ensuring that the arm 124 and the object are able to move from the inside 120 of the vehicle 100 to the outside 122 of the vehicle 100 through a vehicle opening without either the arm 124 or the object colliding with an edge of the vehicle opening.

The transport plan may include a rate of movement. In other words, the speed at which the arm 124 moves from inside the vehicle 100 to outside the vehicle 100 or vice versa. The transport plan may determine the rate of movement based on the object's attributes. As an example, the transport plan may include a rate of movement that is predetermined to be an acceptable pace at which to move a person, which may be slower than an acceptable pace at which to move a piece of luggage.

In an embodiment that includes the grip 146 and/or the second arm, the planning module 430 may determine a transport plan that includes a sequence of movements of the grip 146 and/or the second arm. The transport plan for the grip 146 may include positioning of the grip 146 and when to move the grip 146 into the open position and into the closed position. As an example, when moving a suitcase having a top handle, the transport plan may include navigating the arm 124 such that the grip 146 aligns with the top handle, and moving the grip 146 from the open position to the closed position such that the grip 146 engages with the top handle. As another example, if the arm 124 is moving a person, the grip 146 may move into a closed position, in which the opposing segments 148 are in contact with the person but are in spaced from each other. The transport plan for the second arm may complement or mirror the transport plan of the arm 124.

In an embodiment that includes a lock 132, the planning module 430 may determine a transport plan that includes moving the lock 132 between the locked and unlocked positions.

The arm control module 440 generally includes instructions that function to control the processor 310 to move the arm 124 to, based on the transport plan, engage the object, move between the retracted position and the extended position, and disengage the object to move the object into or out of the vehicle 100. The arm control module 440 may transmit signals to the arm actuators 126 to move the arm 124 based on the transport plan. In an embodiment having a grip 146, and/or a second arm, the arm control module 440 may transmit signals to the grip actuators 150 and/or second arm actuators respectively.

In an embodiment having a platform and a guardrail, the arm control module 440 may transmit signals to actuators coupling the platform to the arm to move the platform between the lowered and raised position. The arm control module 440 may also transmit signals to actuators coupling the guardrail to the platform to move the guardrail between the folded position and the upright position.

In an embodiment with a lock, the object transport control system 128 may include the object securing module 450. The object securing module 450 generally includes instructions that, when executed by the processor 310, cause the processor 310 to, based on the transport plan, control the lock 132 between the unlocked position and the locked position.

Referring now to FIG. 5, an example of a process of moving at least one object from outside a vehicle 100 to inside a vehicle 100 using an arm 124 mounted to the vehicle 100 and movable between a retracted position inside the vehicle 100 and an extended position outside the vehicle 100 is shown. Various possible steps of process 500 will now be described. The process 500 illustrated in FIG. 5 may be applicable to the embodiments described above in relation to FIGS. 1-4, but it is understood that the process 500 can be carried out with other suitable systems and arrangements. Moreover, the process 500 may include other steps that are not shown here, and in fact, the process 500 is not limited to including every step shown in FIG. 5. The steps that are illustrated here as part of the process 500 are not limited to this particular chronological order. Indeed, some of the steps may be performed in a different order than what is shown and/or at least some of the steps shown can occur simultaneously. Process 500 will be discussed from the perspective of the object transport control system 128.

At block 510, sensors 118 detect at least one object in an environment 120, 122 of the vehicle 100. The environment 120, 122 of the vehicle 100 may include an environment 122 outside of the vehicle 100. The sensors 118 may detect multiple objects in the environment 122 outside of the vehicle 100. For each object, the sensor 118 may detect a distance from the object to the vehicle 100, dimensions and/or weight of the object.

The environment 120, 122 of the vehicle 100 may include an environment 120 inside of the vehicle 100. Sensors 118 may further detect objects and spacings inside the vehicle 100, such that the object transport control system 128 may determine where within the vehicle 100 to place an object moved into the vehicle 100 from outside the vehicle 100.

At block 520, the object identification module 420 receives data based on the detecting of the object. The object identification module 420 can employ various techniques to acquire data from the sensors 118 that are either active or passive. For example, the object identification module 420 may passively sniff the data inputs from a stream of electronic information provided by the various sensors 118 to further components within the vehicle 100. As another example, the object identification module 420 may actively request and/or poll the sensors 118 for data.

At block 530, the object identification module 420 identifies, based on the received data, at least one object for transportation. As mentioned above and as an example, the object identification module 420 may use machine learning techniques and/or databases to identify objects and distinguish between objects that are part of the environment and objects that are to be transported. As another example, when a request for an object pick-up is submitted to the object transport system 102 from a passenger or a delivery service, the request may include information about the object such as the type of object. The request may be an audio message including a description of the object. The request may be a visual message including an image of the object. The visual message may include, for example, the passenger pointing at the object. Based on that information or image, the object identification module 420 may compare images received from the sensors such as the camera 328 to the information provided in the request to identify an object scheduled for pick-up.

At block 540, the object identification module 420 determines, based on the received data, at least one attribute for the object. Attributes, as mentioned above, may include a distance between a vehicle 100 and the object, a weight, dimensions and/or a type of objects. The object identification module 420 may determine attributes for the object using machine learning techniques.

To determine the distance between the vehicle 100 and the object, the object identification module 420 may, as an example, receive a distance measurement from sensors 118 such as radar sensors 325 and ultrasound sensors. To determine a weight and/or dimensions of the object, the object identification module 420 may, as an example, receive an image of the object and using machine learning and/or an image database, determine the dimensions of the object and/or predict the weight of the object based on the database. Further, to determine the object type (e.g., a person, an animal, a suitcase, a box), the object identification module 420 may compare images received from a sensor 118 such as a camera 328 to images in an image database, to identify the type of object.

At block 550, the planning module 430 determines a transport plan of how to move the object into the vehicle 100 based on the object's attributes. As an example, the planning module 430 may determine the transport plan based on one or more of the weight and dimensions of the object, the type of object, the distance between the object and the vehicle 100, the spacings available inside the vehicle 100 to receive the object when the arm 124 has moved the object into the vehicle 100.

The planning module 430 may determine whether the object is within reach of the arm 124 by comparing the distance between the vehicle 100 and the object to a reach of the fully extended arm 124. In the case where the distance between the vehicle 100 and the object exceeds the reach of the fully extended arm 124, the planning module 430 may not generate a transport plan and may notify an autonomous vehicle and/or a driver that a transport plan was not generated because the object is not within the reach of the arm 124. Based on the notification, the autonomous vehicle or the driver may move the vehicle 100 such that the object is within the reach of the arm 124. When the distance between the vehicle 100 and the object is within the reach of the fully extended arm 124, the planning module 430 may generate a transport plan.

The planning module 430 may determine the transport plan based on a current positioning of the arm 124 and/or spacing inside the vehicle 100. The current positioning of the arm 124 may be a starting position for a sequence of movements disclosed in the transport plan. The planning module 430 may receive a position request from the passenger or the delivery service, describing a location within the vehicle 100 that the object should be placed. Based on the position request and the spacing inside the vehicle 100, the planning module 430 may determine a final position for the object inside the vehicle 100. In a case where the planning module 430 determines there is no final position inside the vehicle 100 that the arm 124 may place the object, the planning module 430 may notify the autonomous vehicle and/or the driver.

At block 560, the arm control module 440 controls the arm 124 to, based on the transport plan, move at least one object into the vehicle 100. As an example, the arm control module 440 controls the arm 124 to engage the object and move between the retracted position and the extended position. The arm control module 440 also controls the arm 124 to disengage the object when the object is in the vehicle 100. The arm control module 440 may transmit signals to arm actuators 126 connected to the arm 124, signaling to the arm actuators 126 to move in predetermined angles and directions, according to a sequence in the transport plan.

At block 570, the object securing module 450 determines whether the object is in a securable position based on data received from a sensor such as the camera 328 or the weight sensor(s) 322. In one embodiment, the vehicle 100 may include locks 132 and lock actuators 134. In such an embodiment, the object transport control system 128 may determine whether an object placed in the vehicle 100 is in a position such that the object can be secured (or immovably fixed) to the vehicle 100.

At block 580, the object securing module 450 controls a lock 132 inside the vehicle 100 between an unlocked position and a locked position. The object securing module 450 may transmit a signal to the lock actuators 134 to move the lock 132 into the locked position and secure the object. As an example, if the object moved into the vehicle 100 is a wheelchair, the locks 132 may move into the locked position while passing through wheels of the wheelchair to secure the wheelchair and render the wheelchair immobile. After block 580, process 500 ends.

Referring now to FIG. 6, an example of a process of moving at least one object from inside a vehicle to outside a vehicle using an arm 124 mounted to the vehicle 100 and movable between a retracted position inside the vehicle 100 and an extended position outside the vehicle 100 is shown. Various possible steps of process 600 will now be described. The process 600 illustrated in FIG. 6 may be applicable to the embodiments described above in relation to FIGS. 1-4, but it is understood that the process 600 can be carried out with other suitable systems and arrangements. Moreover, the process 600 may include other steps that are not shown here, and in fact, the process 600 is not limited to including every step shown in FIG. 6. The steps that are illustrated here as part of the process 600 are not limited to this particular chronological order. Indeed, some of the steps may be performed in a different order than what is shown and/or at least some of the steps shown can occur simultaneously. Process 600 will be discussed from the perspective of the object transport control system 128.

At block 610, sensors 118 detect at least one object in an environment 120, 122 of the vehicle 100. As previously mentioned, the environment 120, 122 of the vehicle 100 may include an environment 120 inside the vehicle 100 and an environment 122 outside the vehicle 100. The sensors 118 may detect multiple objects inside the vehicle 100. For each object, sensors 118 may detect positioning of the object in the vehicle 100 relative to the arm 124, dimensions and weight of the object. Sensors 118 such as cameras 328 and weight sensors 322 may detect and/or determine dimensions and weight of the object, respectively. Sensors 118 may further detect spacings inside the vehicle 100, such that the object transport control system 128 may determine how to navigate the arm 124 in the vehicle 100 to access an object to be moved out of the vehicle 100. Sensors 118 may detect an environment 122 outside the vehicle 100 to determine where to place the object when the arm 124 moves the object out of the vehicle 100.

At block 620, the object identification module 420 receives data based on the detecting of the object. As mentioned above, the object identification module 420 can employ various techniques to acquire data from the sensors 118 that are either active or passive.

At block 630, the object identification module 420 identifies, based on the received data, at least one object for transportation. As mentioned above, the object identification module 420 may use machine learning techniques and/or databases to identify objects and distinguish between objects that are part of the environment 120, 122 and objects that are to be transported.

At block 640, the object identification module 420 determines, based on the received data, at least one attribute for the object. In addition to attributes mentioned above, attributes may include a distance between the arm 124 and the object. The object identification module 420 may determine attributes for the object using artificial intelligence techniques and as previously mentioned, machine learning techniques.

At block 650, the planning module 430 determines a transport plan of how to move the object out of the vehicle 100 based on the object's attributes.

As an example, in addition to the planning module 430 determining the transport plan based on one or more of the weight and dimensions of the object, the type of object, as described above, the planning module 430 may determine the transport plan based on the distance between the arm 124 and the object inside the vehicle 100 and a location outside the vehicle 100 that the arm 124 may place the object upon moving the object out of the vehicle 100.

The planning module 430 may determine whether there is a suitable location outside the vehicle 100 to place the object. As an example, the planning module 430 may determine, based on images from the sensors 118, that there is a puddle of water beside the vehicle 100 and the fully extended arm 124 may not reach a dry location to place the object. As another example, the planning module 430 may determine, based on the sensors 118, that a ground within the reach of the fully extended arm 124 is uneven and/or severely sloped. In such examples, the planning module 430 may notify the autonomous vehicle and/or a driver that there is no suitable location to place the object outside the vehicle 100 and wait for further instruction from the autonomous vehicle or the driver. The planning module 430 may then generate a transport plan based on instructions received from the autonomous vehicle and/or the driver. In the case where the planning module 430 determines there is a suitable location outside the vehicle 100 to place the object, the planning module 430 may generate the transport plan.

At block 660, the object securing module 450 controls a lock inside the vehicle 100 between an unlocked position and a locked position. The object securing module 450 may determine whether the locks 132 proximate to the object to be moved are in the locked position. In the case where the locks 132 are in the locked position, the object securing module 450 may send a signal to the lock actuators 134 to move the locks 132 from the locked position to the open position, thereby disengaging the locks 132 from the object.

At block 670, the arm control module 440 controls the arm 124 to, based on the transport plan, move the object out of the vehicle 100. As an example, the arm control module 440 may engage the object and move between the retracted position and the extended position. The arm control module 440 may then disengage the object when the object is outside of the vehicle 100. As mentioned above, the arm control module 440 may transmit signals to arm actuators 126 connected to the arm 124 and to the grip 146, signaling to the arm actuators 126 to move in predetermined angles and directions, according to a sequence in the transport plan such as described above, until the end of the transport plan is reached and the object is placed outside the vehicle 100. After block 670, process 600 ends.

FIG. 3 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

The vehicle 100 can include one or more processors 310. In one or more arrangements, the processor(s) 310 can be a main processor of the vehicle 100. For instance, the processor(s) 310 can be an electronic control unit (ECU). The vehicle 100 can include one or more data stores 315 for storing one or more types of data. The data store 315 can include volatile and/or non-volatile memory. Examples of suitable data stores 315 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 315 can be a component of the processor(s) 310, or the data store 315 can be operatively connected to the processor(s) 310 for use thereby. The term "operatively connected," as used throughout this description, can include direct or indirect connections, including connections without direct physical contact.

In one or more arrangements, the one or more data stores 315 can include sensor data 319. In this context, "sensor data" means any information about the sensors that the vehicle 100 is equipped with, including the capabilities and other information about such sensors. As will be explained below, the vehicle 100 can include the sensor system 320. The sensor data 319 can relate to one or more sensors of the sensor system 320. As an example, in one or more arrangements, the sensor data 319 can include information on one or more LIDAR sensors 326 of the sensor system 320.

In some instances, at least a portion of the sensor data 319 can be located in one or more data stores 315 located onboard the vehicle 100. Alternatively, or in addition, at least a portion of the map data and/or the sensor data 319 can be located in one or more data stores 315 that are located remotely from the vehicle 100.

As noted above, the vehicle 100 can include the sensor system 320. In addition to the object transport control system 128, the sensor system 320 and/or the one or more sensors can be operatively connected to the processor(s) 310, the data store(s) 315, and/or another element of the vehicle 100 (including any of the elements shown in FIG. 3). The sensor system 320 can acquire data of at least a portion of the external environment of the vehicle 100 (e.g., nearby vehicles).

As previously mentioned, the sensor system 320 can include any suitable type of sensor. Various examples of different types of sensors will be described herein. However, it will be understood that the embodiments are not limited to the particular sensors described. The sensor system 320 can include one or more vehicle sensors 321. The vehicle sensor(s) 321 can detect, determine, and/or sense information about the vehicle 100 itself. In one or more arrangements, the vehicle sensor(s) 321 can be configured to detect, and/or sense position and orientation changes of the vehicle 100, such as, for example, based on inertial acceleration. In one or more arrangements, the vehicle sensor(s) 321 can include one or more accelerometers, one or more gyroscopes, an inertial measurement unit (IMU), a dead-reckoning system, a global navigation satellite system (GNSS), a global positioning system (GPS), a navigation system 347, and/or other suitable sensors. The vehicle sensor(s) 321 can be configured to detect, and/or sense one or more characteristics of the vehicle 100. In one or more arrangements, the vehicle sensor(s) 321 can include a speedometer to determine a current speed of the vehicle 100.

The sensor system 320 can include one or more environment sensors 323 configured to acquire, and/or sense driving environment data. "Driving environment data" includes data or information about the external environment in which an autonomous vehicle is located or one or more portions thereof. For example, the one or more environment sensors 323 can be configured to detect, quantify and/or sense obstacles in at least a portion of the external environment of the vehicle 100 and/or information/data about such obstacles. Such obstacles may be stationary objects and/or dynamic objects. The one or more environment sensors 323 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 320 will be described herein. The example sensors may be part of the one or more environment sensors 323 and/or the one or more vehicle sensors 321. However, it will be understood that the embodiments are not limited to the particular sensors described.

The vehicle 100 can include one or more vehicle systems 340. Various examples of the one or more vehicle systems 340 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 341, a braking system 342, a steering system 343, throttle system 344, a transmission system 345, a signaling system 346, and/or a navigation system 347. Each of these systems can include one or more devices, components, and/or a combination thereof, now known or later developed.

The navigation system 347 can include one or more devices, applications, and/or combinations thereof, now known or later developed, configured to determine the geographic location of the vehicle 100 and/or to determine a travel route for the vehicle 100. The navigation system 347 can include one or more mapping applications to determine a travel route for the vehicle 100. The navigation system 347 can include a global positioning system, a local positioning system or a geolocation system.

The processor(s) 310, the object transport system 102, and/or the autonomous driving module(s) 360 can be operatively connected to communicate with the various vehicle systems 340 and/or individual components thereof. For example, returning to FIG. 3, the processor(s) 310, the object transport system 102, and/or the autonomous driving module(s) 360 can be in communication to send and/or receive information from the various vehicle systems 340 to control the movement, speed, maneuvering, heading, direction, etc. of the vehicle 100. The processor(s) 310, the object transport system 102, and/or the autonomous driving module(s) 360 may control some or all of these vehicle systems 340.

The processor(s) 310, the object transport system 102, and/or the autonomous driving module(s) 360 may be operable to control the navigation and/or maneuvering of the vehicle 100 by controlling one or more of the vehicle systems 340 and/or components thereof. For instance, when operating in an autonomous mode, the processor(s) 310, the object transport system 102, and/or the autonomous driving module(s) 360 can control the direction and/or speed of the vehicle 100. The processor(s) 310, the object transport system 102, and/or the autonomous driving module(s) 360 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 350. The actuators 350 can be any element or combination of elements operable to modify, adjust and/or alter one or more of the vehicle systems 340 or components thereof to responsive to receiving signals or other inputs from the processor(s) 310 and/or the autonomous driving module(s) 360. Any suitable actuator can be used. For instance, the one or more actuators 350 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 310, implement one or more of the various processes described herein. One or more of the modules can be a component of the processor(s) 310, or one or more of the modules can be executed on and/or distributed among other processing systems to which the processor(s) 310 is operatively connected. The modules can include instructions (e.g., program logic) executable by one or more processor(s) 310. Alternatively, or in addition, one or more data store 315 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 360. The autonomous driving module(s) 360 can be configured to receive data from the sensor system 320 and/or any other type of system capable of capturing information relating to the vehicle 100 and/or the external environment of the vehicle 100. In one or more arrangements, the autonomous driving module(s) 360 can use such data to generate one or more driving scene models. The autonomous driving module(s) 360 can determine position and velocity of the vehicle 100. The autonomous driving module(s) 360 can determine the location of obstacles, obstacles, or other environmental features including traffic signs, trees, shrubs, neighboring vehicles, pedestrians, etc.

The autonomous driving module(s) 360 can be configured to receive, and/or determine location information for obstacles within the external environment of the vehicle 100 for use by the processor(s) 310, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 360 either independently or in combination with the object transport system 102 can be configured to determine travel path(s), current autonomous driving maneuvers for the vehicle 100, future autonomous driving maneuvers and/or modifications to current autonomous driving maneuvers based on data acquired by the sensor system 320, driving scene models, and/or data from any other suitable source such as determinations from the sensor data 319. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 360 can be configured to implement determined driving maneuvers. The autonomous driving module(s) 360 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 360 can be configured to execute various vehicle functions and/or to transmit data to, receive data from, interact with, and/or control the vehicle 100 or one or more systems thereof (e.g., one or more of vehicle systems 340).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, Python, C++ or the like, conventional procedural programming languages, such as the "C" programming language or similar programming languages, and other programming languages such as Golang or Matlab. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

The invention claimed is:

1. A system for transporting an object into a vehicle, the vehicle being an automobile and having a vehicle body, comprising:
   a sensor configured to detect a plurality of objects in an environment of the vehicle;
   an arm mounted to the vehicle and movable between a retracted position inside the vehicle body and an extended position outside the vehicle body;
   a processor operatively connected to the arm; and
   a memory communicably coupled to the processor and storing:
      an object identification module including instructions that, when executed by the processor, cause the processor to, based on data received from the sensor, identify at least one object for transportation and determine at least one attribute for the at least one object;
      a planning module including instructions that, when executed by the processor, cause the processor to determine a transport plan of how to move the at least one object into the vehicle based on the determined at least one attribute; and
      an arm control module including instructions that, when executed by the processor, cause the processor to, based on the transport plan, control the arm to move from the retracted position to the extended position, engage the at least one object, move from the extended position to the retracted position, and disengage the at least one object to move the at least one object into the vehicle.

2. The system of claim 1, wherein the determined at least one attribute includes at least one of a weight of the at least one object, dimensions of the at least one object, a type of the at least one object, and a position of the at least one object relative to the vehicle.

3. The system of claim 1, wherein the planning module further includes instructions that cause the processor to compare the at least one attribute of the at least one object to a predetermined value and determine the transport plan when the at least one attribute of the at least one object compares favorably with the predetermined value.

4. The system of claim 1, further comprising a lock inside the vehicle, wherein the lock is movable between an unlocked position and a locked position, wherein in the locked position, the lock secures the at least one object; and
   wherein the memory stores an object securing module including instructions that, when executed by the processor, cause the processor to, based on the transport plan, control the lock between the unlocked position and the locked position.

5. The system of claim 1, further comprising a grip coupled to the arm and movable between an open position and a closed position, wherein in the closed position, the grip engages the at least one object; and
   wherein the arm control module further includes instructions that cause the processor to, based on the transport plan, control the grip to move between the open position and the closed position.

6. The system of claim 1, further comprising a platform coupled to the arm, wherein the platform is movable between a lowered position and a raised position;
   wherein the platform has a guardrail, wherein the guardrail is movable between a folded position and an upright position; and
   wherein the arm control module further includes instructions that cause the processor to, based on the transport plan, control the platform between the lowered and raised position; and control the guardrail between the folded position and the upright position.

7. A system for transporting an object out of a vehicle, the vehicle being an automobile and having a vehicle body, comprising:

a sensor configured to detect a plurality of objects in an environment of the vehicle;

an arm mounted to the vehicle and movable between a retracted position inside the vehicle body and an extended position outside the vehicle body;

a processor operatively connected to the arm; and a memory communicably coupled to the processor and storing:

an object identification module including instructions that, when executed by the processor, cause the processor to, based on data received from the sensor, identify at least one object for transportation and determine at least one attribute for the at least one object;

a planning module including instructions that, when executed by the processor, cause the processor to determine a transport plan of how to move the at least one object out of the vehicle based on the determined at least one attribute; and an arm control module including instructions that, when executed by the processor, cause the processor to, based on the transport plan, control the arm to engage the at least one object, move from the retracted position to the extended position, and disengage the at least one object to move the at least one object out of the vehicle.

8. The system of claim 7, wherein the determined at least one attribute includes at least one of a weight of the at least one object, dimensions of the at least one object, a type of the at least object, and a position of the at least one object relative to the vehicle.

9. The system of claim 7, wherein the planning module further includes instructions that cause the processor to compare the at least one attribute of the at least one object to a predetermined value, and determine the transport plan when the at least one attribute of the at least one object compares favorably with the predetermined value.

10. The system of claim 7, further comprising a lock inside the vehicle, wherein the lock is movable between an unlocked position and a locked position, wherein in the locked position, the lock secures the at least one object; and wherein the memory stores an object securing module including instructions that, when executed by the processor, cause the processor to, based on the transport plan, control the lock between the unlocked position and the locked position.

11. The system of claim 7, further comprising a grip coupled to the arm and movable between an open position and a closed position, wherein in the closed position, the grip engages the at least one object; and wherein the arm control module further includes instructions that cause the processor to, based on the transport plan, control the grip to move between the open position and the closed position.

12. The system of claim 7, further comprising a platform coupled to the arm, wherein the platform is movable between a lowered position and a raised position;

wherein the platform has a guardrail, wherein the guardrail is movable between a folded position and an upright position; and wherein the arm control module further includes instructions that cause the processor to, based on the transport plan, control the platform between the lowered and raised position; and control the guardrail between the folded position and the upright position.

13. A method for transporting an object into a vehicle, the vehicle being an automobile and having a vehicle body, using an arm mounted to the vehicle and movable between a retracted position inside the vehicle body and an extended position outside the vehicle body, the method comprising:

detecting a plurality of objects in an environment of the vehicle with a sensor;

identifying, based on data received from the sensor, at least one object for transportation;

determining, based on the data received from the sensor, at least one attribute for the at least one object;

determining a transport plan of how to move the at least one object into the vehicle based on the determined at least one attribute; and based on the transport plan, controlling the arm to move from the retracted position to the extended position, engage the at least one object, move from the extended position to the retracted position, and disengage the at least one object to move the at least one object into the vehicle.

14. The method of claim 13, wherein the determined at least one attribute includes at least one of a weight of the at least one object, dimensions of the at least one object, a type of the at least object, and a position of the at least one object relative to the vehicle.

15. The method of claim 13, further comprising:

comparing the at least one attribute of the at least one object to a predetermined value; and determining the transport plan when the at least one attribute of the at least one object compares favorably with the predetermined value.

16. The method of claim 13, further comprising:

based on the transport plan, controlling a lock inside the vehicle between an unlocked position and a locked position, wherein in the locked position, the lock secures the at least one object.

17. The method of claim 13, further comprising:

based on the transport plan, controlling a grip to move between an open position and a closed position, wherein in the closed position, the grip engages the at least one object, and wherein the grip is coupled to the arm.

18. A method for transporting an object out of a vehicle, the vehicle being an automobile and having a vehicle body, using an arm mounted to the vehicle and movable between a retracted position inside the vehicle body and an extended position outside the vehicle body, the method comprising:

detecting a plurality of objects in an environment of the vehicle with a sensor;

identifying, based on data received from the sensor, at least one object for transportation;

determining, based on the data received from the sensor, at least one attribute for the at least one object;

determining a transport plan of how to move the at least one object out of the vehicle based on the determined at least one attribute; and based on the transport plan, controlling the arm to engage the at least one object, move from the retracted position to the extended position, and disengage the at least one object to move the at least one object out of the vehicle.

19. The method of claim 18, wherein the determined at least one attribute includes at least one of a weight of the at least one object, dimensions of the at least one object, a type of the at least object, and a position of the at least one object relative to the vehicle.

20. The method of claim 18, further comprising:
comparing the at least one attribute of the at least one object to a predetermined value; and
determining the transport plan when the at least one attribute of the at least one object compares favorably with the predetermined value.

* * * * *